US011933368B1

(12) United States Patent
Kobayashi et al.

(10) Patent No.: US 11,933,368 B1
(45) Date of Patent: Mar. 19, 2024

(54) CLUTCH DEVICE AND MOTORCYCLE

(71) Applicant: Kabushiki Kaisha F.C.C., Hamamatsu (JP)

(72) Inventors: Yuki Kobayashi, Hamamatsu (JP); Takayuki Suzuki, Hamamatsu (JP)

(73) Assignee: KABUSHIKI KAISHA F.C.C., Shizuoka (JP)

( * ) Notice: Subject to any disclaimer, the term of this patent is extended or adjusted under 35 U.S.C. 154(b) by 0 days.

(21) Appl. No.: 18/242,163

(22) Filed: Sep. 5, 2023

(30) Foreign Application Priority Data

Sep. 6, 2022 (JP) .................... 2022-141609

(51) Int. Cl.
| F16D 13/70 | (2006.01) |
|---|---|
| F16D 13/52 | (2006.01) |
| F16D 13/74 | (2006.01) |
| F16D 23/12 | (2006.01) |

(52) U.S. Cl.
CPC ............ *F16D 13/70* (2013.01); *F16D 13/52* (2013.01); *F16D 13/74* (2013.01); *F16D 23/12* (2013.01); *F16D 2023/123* (2013.01)

(58) Field of Classification Search
CPC .......... F16D 13/52; F16D 13/70; F16D 13/74; F16D 2023/123
See application file for complete search history.

(56) References Cited

U.S. PATENT DOCUMENTS

| 2015/0041275 | A1 | 2/2015 | Satou et al. | |
|---|---|---|---|---|
| 2017/0159725 | A1* | 6/2017 | Imanishi | .............. F16D 13/52 |
| 2020/0158194 | A1* | 5/2020 | Kataoka | .............. F16D 13/56 |

FOREIGN PATENT DOCUMENTS

| EP | 4 194 711 A1 | 6/2023 |
|---|---|---|
| JP | 5847551 B2 | 1/2016 |
| JP | 2020-200842 A | 12/2020 |
| JP | 7196356 B1 | 12/2022 |
| WO | 2022/030349 A1 | 2/2022 |

OTHER PUBLICATIONS

Official Communication issued in Japanese Patent Application No. 2022-141609, dated Dec. 6, 2022.

* cited by examiner

*Primary Examiner* — Stacey A Fluhart
(74) *Attorney, Agent, or Firm* — Keating & Bennett, LLP

(57) ABSTRACT

A clutch device includes a pressure plate movable toward or away from a clutch center, rotatable relative to the clutch center, and operable to press input-side rotating plates and output-side rotating plates. The clutch center includes an oil passage, at least a portion of which is located in an inner peripheral surface of an outer peripheral wall to guide clutch oil to a center-side fitting portion. The pressure plate includes a pressure-side recess on an outer peripheral surface of a pressure-side fitting portion, recessed radially inward from the outer peripheral surface over the entire outer peripheral surface in movement directions, and continuous with the pressure-side cam hole when seen in movement directions. The pressure-side recess communicates with the oil passage.

13 Claims, 14 Drawing Sheets

CLUTCH DEVICE AND MOTORCYCLE

CROSS REFERENCE TO RELATED APPLICATIONS

This application claims the benefit of priority to Japanese Patent Application No. 2022-141609 filed on Sep. 6, 2022. The entire contents of this application are hereby incorporated herein by reference.

BACKGROUND OF THE INVENTION

1. Field of the Invention

The present disclosure relates to a clutch device and a motorcycle. More particularly, the present disclosure relates to a clutch device that arbitrarily allows or interrupts transfer of a rotation driving force of an input shaft that is rotationally driven by a prime mover such as an engine to an output shaft, and also relates to a motorcycle including the clutch device.

2. Description of the Related Art

Conventional vehicles such as motorcycles include clutch devices. A clutch device is disposed between an engine and a drive wheel and allows or interrupts transfer of a rotation driving force of the engine to the drive wheel. The clutch device generally includes a plurality of input-side rotating plates that rotate by a rotation driving force of an engine and a plurality of output-side rotating plates connected to an output shaft that transfers the rotation driving force to a drive wheel. The input-side rotating plates and the output-side rotating plates are alternately arranged in a stacking direction, and the input-side rotating plates and the output-side rotating plates are brought into pressure contact with each other and are separated from each other so that transfer of a rotation driving force is allowed or interrupted.

Japanese Patent No. 5847551, for example, discloses a clutch device including a clutch center (clutch member) that holds output-side rotating plates (driven-side clutch plates), and a pressure plate (pressure member) movable toward or away from the clutch center. The pressure plate is configured to press the input-side rotating plates and the output-side rotating plates. In this manner, the clutch device employs an assembly of the clutch center and the pressure plate.

Clutch oil that has flowed from the output shaft is distributed in the clutch center. A portion of the clutch oil is distributed to the outside from the clutch center through a gap between a center-side fitting portion of the clutch center and a pressure-side fitting portion of the pressure plate slidably fitted in the center-side fitting portion, and is supplied to the input-side rotating plates and the output-side rotating plates. Thus, it is desired that clutch oil is efficiently discharged to the outside of the clutch center through a gap between the center-side fitting portion and the pressure-side fitting portion and supplied to the input-side rotating plates and the output-side rotating plates.

SUMMARY OF THE INVENTION

Preferred embodiments of the present disclosure provide clutch devices each capable of efficiently discharging clutch oil to the outside of a clutch center through a gap between a center-side fitting portion and a pressure-side fitting portion to supply clutch oil to input-side rotating plates and output-side rotating plates, and motorcycles including such clutch devices.

A clutch device according to a preferred embodiment of the present disclosure is a clutch device that allows or interrupts transfer of a rotation driving force of an input shaft, and includes a clutch center housed in a clutch housing holding a plurality of input-side rotating plates to be rotationally driven by rotational driving of the input shaft, the clutch center holding a plurality of output-side rotating plates and being operable to be rotationally driven together with the output shaft, the input-side rotating plates and the output-side rotating plates being alternately arranged, and a pressure plate movable toward or away from the clutch center and rotatable relative to the clutch center, the pressure plate being operable to press the input-side rotating plates and the output-side rotating plates. The clutch center includes an output shaft holding portion to which the output shaft is coupled, an outer peripheral wall located radially outward of the output shaft holding portion, a center-side fitting portion located on an inner peripheral surface of the outer peripheral wall, and an oil passage at least a portion of which is located in the inner peripheral surface of the outer peripheral wall to guide clutch oil to the center-side fitting portion. The pressure plate includes a plurality of pressure-side cam portions each including at least one of a pressure-side assist cam surface or a pressure-side slipper cam surface, the pressure-side assist cam surface being operable to generate a force in a direction from the pressure plate toward the clutch center in order to increase a pressing force between the input-side rotating plates and the output-side rotating plates upon rotation relative to the clutch center, the pressure-side slipper cam surface being operable to cause the pressure plate to move away from the clutch center in order to reduce the pressing force between the input-side rotating plates and the output-side rotating plates upon rotation relative to the clutch center, a pressure-side cam hole penetrating a portion between adjacent ones of the pressure-side cam portions, a pressure-side fitting portion located radially outward of the pressure-side cam portions and slidably fitting in the center-side fitting portion, and a pressure-side recess located on an outer peripheral surface of the pressure-side fitting portion, recessed radially inward from the outer peripheral surface over the entire outer peripheral surface in movement directions, and being continuous with the pressure-side cam hole when seen in the movement directions, assuming directions in which the pressure plate moves toward and away from the clutch center are the movement directions. The pressure-side recess communicates with the oil passage.

In a clutch device according to a preferred embodiment of the present disclosure, the pressure-side recess communicates with the oil passage. Accordingly, clutch oil flowing in the oil passage also flows in the pressure-side recess. The pressure-side recess is recessed radially inward from the outer peripheral surface of the pressure-side fitting portion over the entire outer peripheral surface in the movement directions. Thus, a larger amount of clutch oil is discharged to the outside of the clutch center through the pressure-side recess. That is, a larger amount of clutch oil is supplied to the input-side rotating plates and the output-side rotating plates. In addition, since the pressure-side recess is continuous with the pressure-side cam hole when seen in the movement directions, when clutch oil flows from the outside of the clutch center into the clutch center through the pressure-side cam hole, for example, the clutch oil that has flowed in the clutch center is held in the pressure-side recess.

Accordingly, clutch oil can be supplied from the pressure-side recess to the input-side rotating plates and the output-side rotating plates.

Preferred embodiments of the present invention provide clutch devices each capable of efficiently discharging clutch oil to the outside of a clutch center through a gap between a center-side fitting portion and a pressure-side fitting portion to supply clutch oil to input-side rotating plates and output-side rotating plates.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
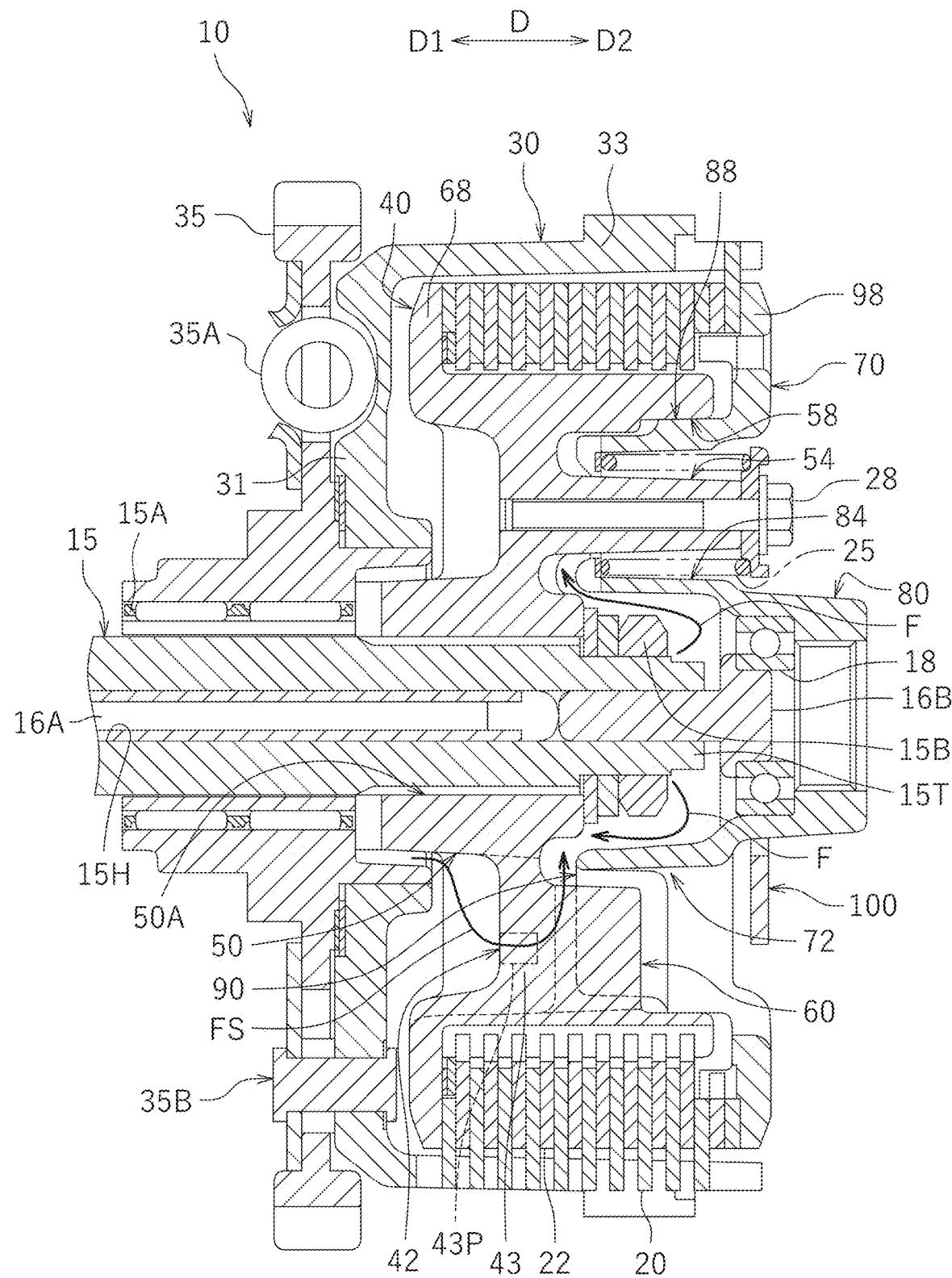
FIG. 1 is a cross-sectional view of a clutch device according to a first preferred embodiment of the present invention.

Clutch devices according to preferred embodiments of the present disclosure will be described hereinafter with reference to the drawings. The preferred embodiments described herein are, of course, not intended to particularly limit the present disclosure. Elements and features having the same functions are denoted by the same reference characters, and description for the same elements and features will not be repeated or will be simplified as appropriate.

First Preferred Embodiment

FIG. 1 is a cross-sectional view of a clutch device 10 according to this preferred embodiment. The clutch device 10 is provided in a vehicle such as a motorcycle, for example. The clutch device 10 allows or interrupts transfer of a rotation driving force of an input shaft (crankshaft) of an engine of the motorcycle to an output shaft 15, for example. The clutch device 10 allows or interrupts transfer of a rotation driving force of the input shaft to a drive wheel (rear wheel) through the output shaft 15. The clutch device 10 is disposed between the engine and a transmission.

In the following description, directions in which a pressure plate 70 of the clutch device 10 and the clutch center 40 are arranged will be referred to as directions D, a direction in which the pressure plate 70 moves toward the clutch center 40 will be referred to as a first direction D1, and a direction in which the pressure plate 70 moves away from the clutch center 40 will be referred to as a second direction D2. The directions D are examples of movement directions. Circumferential directions of the clutch center 40 and the pressure plate 70 will be referred to as circumferential directions S, one of the circumferential direction S from one pressure-side cam portion 90 to another pressure-side cam portion 90 will be referred to as a first circumferential direction S1 (see FIG. 5), and one of the circumferential direction S from the other pressure-side cam portion 90 to the one pressure-side cam portion 90 will be referred to as a second circumferential direction S2 (see FIG. 5). In this preferred embodiment, axial directions of the output shaft 15, axial directions of a clutch housing 30, axial directions of the clutch center 40, and axial directions of the pressure plate 70 are the same as the directions D. The pressure plate 70 and the clutch center 40 rotate in the first circumferential direction S1. It should be noted that the directions described above are defined simply for convenience of description, and are not intended to limit the state of installation of the clutch device 10 and do not limit the present disclosure.

As illustrated in FIG. 1, the clutch device 10 includes the output shaft 15, input-side rotating plates 20, output-side rotating plates 22, the clutch housing 30, the clutch center 40, the pressure plate 70, and a stopper plate 100.

As illustrated in FIG. 1, the output shaft 15 is a hollow shaft. One end of the output shaft 15 rotatably supports an input gear 35 described later and the clutch housing 30 through a needle bearing 15A. The output shaft 15 fixedly supports a clutch center 40 through a nut 15B. That is, the output shaft 15 rotates together with the clutch center 40. The other end of the output shaft 15 is coupled to a transmission (not shown) of an automobile, for example.

As illustrated in FIG. 1, the output shaft 15 includes, in a hollow portion 15H thereof, a push rod 16A and a push member 16B adjacent to the push rod 16A. The hollow portion 15H defines and functions as a channel of clutch oil. Clutch oil flows in the output shaft 15, that is, in the hollow portion 15H. The push rod 16A and the push member 16B are slidable in the hollow portion 15H of the output shaft 15. The push rod 16A has one end (left end in the drawing) coupled to a clutch operation lever (not shown) of the motorcycle, and slides in the hollow portion 15H by operation of the clutch operation lever and presses the clutch push member 16B in the second direction D2. A portion of the push member 16B projects outward of the output shaft 15 (in the second direction D2 in this preferred embodiment) and is coupled to a release bearing 18 provided on the pressure plate 70. The push rod 16A and the push member 16B are thinner than the inner diameter of the hollow portion 15H so that flowability of clutch oil is obtained in the hollow portion 15H.

The clutch housing 30 is preferably made of an aluminum alloy, for example. The clutch housing 30 has a bottomed cylindrical shape. As illustrated in FIG. 1, the clutch housing 30 includes a bottom wall 31 having a substantially circular shape, and a side wall 33 extending from an edge of the bottom wall 31 in the second direction D2. The clutch housing 30 holds the plurality of input-side rotating plates 20.

As illustrated in FIG. 1, an input gear 35 is disposed on the bottom wall 31 of the clutch housing 30. The input gear 35 is fixed to the bottom wall 31 by a rivet 35B through a torque damper 35A. The input gear 35 meshes with a driving gear (not shown) that rotates by rotational driving of the input shaft of the engine. The input gear 35 is rotationally driven together with the clutch housing 30, independently of the output shaft 15.

The input-side rotating plates 20 is rotationally driven by rotational driving of the input shaft. As illustrated in FIG. 1, the input-side rotating plates 20 are held on the inner peripheral surface of the side wall 33 of the clutch housing 30. The input-side rotating plates 20 are held in the clutch housing 30 by spline fitting. The input-side rotating plates 20 are displaceable along the axial direction of the clutch housing 30. The input-side rotating plates 20 are rotatable together with the clutch housing 30.

The input-side rotating plates 20 are pushed against the output-side rotating plates 22. The input-side rotating plates 20 are ring-shaped flat plates. Each of the input-side rotating plates 20 is shaped by punching a thin plate of a steel plate cold commercial (SPCC) material into a ring shape. Friction members (not shown) of a plurality of paper sheets are attached to the front and back surfaces of the input-side rotating plates 20. A groove with a depth of several micrometers to several tens of micrometers is formed between the friction members to hold clutch oil.

As illustrated in FIG. 1, the clutch center 40 is housed in the clutch housing 30. The clutch center 40 and the clutch housing 30 are concentrically disposed. The clutch center 40 includes a cylindrical body 42 and a flange 68 extending radially outward from the outer edge of the body 42. The clutch center 40 holds the plurality of output-side rotating plates 22 arranged alternately with the input-side rotating plates 20 in the directions D. The clutch center 40 is rotationally driven together with the output shaft 15.

Figure 2:
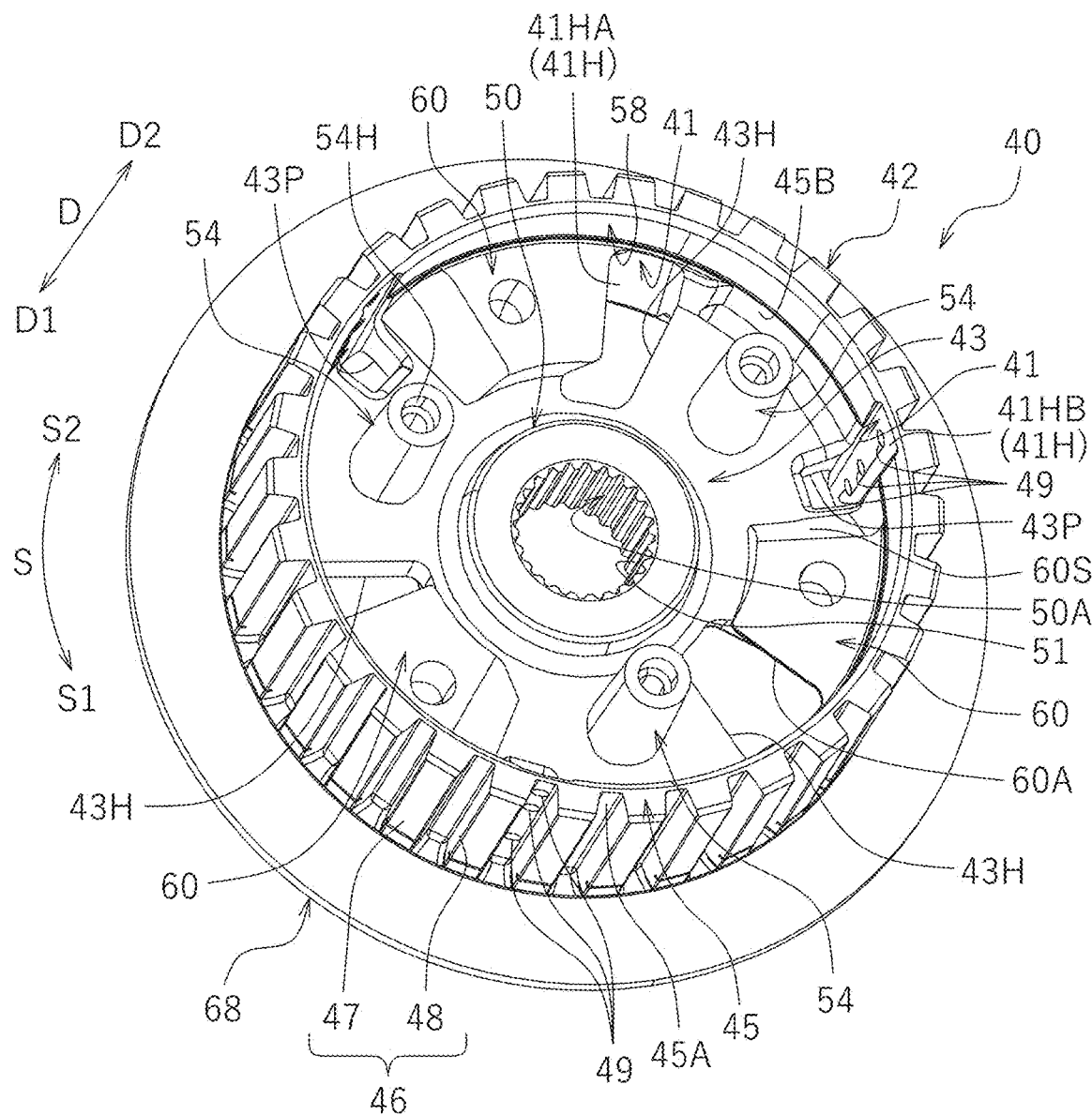
FIG. 2 is a perspective view of a clutch center according to the first preferred embodiment of the present invention.

As illustrated in FIG. 2, the body 42 includes a ring-shaped base wall 43, an outer peripheral wall 45 located radially outward of the base wall 43 and extending in the second direction D2, an output shaft holding portion 50 disposed at the center of the base wall 43, a plurality of center-side cam portions 60 connected to the base wall 43 and the outer peripheral wall 45, and a center-side fitting portion 58.

The output shaft holding portion 50 has a cylindrical shape. The output shaft holding portion 50 has an insertion hole 51 in which the output shaft 15 is inserted and spline-fitted. The insertion hole 51 penetrates the base wall 43. An inner peripheral surface 50A of the output shaft holding portion 50 defining the insertion hole 51 includes a plurality of spline grooves formed along the axial direction. The output shaft 15 is coupled to the output shaft holding portion 50.

As illustrated in FIG. 2, the outer peripheral wall 45 of the clutch center 40 is disposed radially outward of the output shaft holding portion 50. An outer peripheral surface 45A of the outer peripheral wall 45 includes a spline fitting portion 46. The spline fitting portion 46 includes a plurality of center-side fitting teeth 47 extending in the axial directions of the clutch center 40 along the outer peripheral surface 45A of the outer peripheral wall 45, a plurality of spline grooves 48 each formed between adjacent ones of the center-side fitting teeth 47 and extending in the axial directions of the clutch center 40, and oil flow holes 49. The center-side fitting teeth 47 hold the input-side rotating plates 20 and the output-side rotating plates 22. The plurality of center-side fitting teeth 47 are arranged in the circumferential directions S. The plurality of center-side fitting teeth 47 are arranged at regular or substantially regular intervals in the circumferential directions S. The plurality of center-side fitting teeth 47 have the same or substantially the same shape. The center-side fitting teeth 47 project radially outward from the outer peripheral surface 45A of the outer peripheral wall 45. The number of the center-side fitting teeth 47 is preferably a multiple of the number of the center-side cam portions 60. In this preferred embodiment, the number of the center-side cam portions 60 is three, and the number of the center-side fitting teeth 47 is 30, which will be described later. The number of the center-side fitting teeth 47 may not be a multiple of the number of the center-side cam portions 60. The oil flow holes 49 penetrate the outer peripheral wall 45 along the radial directions. Each of the oil flow holes 49 is formed between adjacent ones of the center-side fitting teeth 47. That is, the oil flow holes 49 are formed in the spline grooves 48. The oil flow holes 49 are formed at the sides of the center-side cam portions 60. More specifically, the discharge holes 49 are formed at the sides of the center-side slipper cam surfaces 60S of the center-side cam portions 60. The oil flow holes 49 are formed ahead of the center-side slipper cam surface 60S in the first circumferential direction S1. The oil flow holes 49 are formed ahead of bosses 54 described later in the second circumferential direction S2. The oil flow holes 49 are formed in an oil passage 41 described later. More specifically, the oil flow holes 49 are formed in a second center-side recess 41HB of center-side recesses 41H described later. In this preferred embodiment, three oil flow holes 49 are formed in each of three portions of the outer peripheral wall 45 in the circumferential directions S. The oil flow holes 49 are arranged at regular or substantially regular intervals in the circumferential directions S. The oil flow holes 49 cause the inside and outside of the clutch center 40 to communicate with each other. The oil flow holes 49 allow clutch oil that has flowed from the output shaft 15 into the clutch center 40 to be discharged to the outside of the clutch center 40. In this preferred embodiment, the oil flow holes 49 allow clutch oil flowing at an inner peripheral surface 45B of the outer peripheral wall 45 to be discharged to the outside of the clutch center 40.

The output-side rotating plates 22 are held by the spline fitting portion 46 of the clutch center 40 and the pressure plate 70. A portion of the output-side rotating plates 22 is held by the center-side fitting teeth 47 of the clutch center 40 and the spline grooves 48 by spline fitting. Another portion of the output-side rotating plates 22 is held by a pressure-side fitting teeth 77 (see FIG. 4) described later of the pressure plate 70. The output-side rotating plates 22 are displaceable along the axial directions of the clutch center 40. The output-side rotating plates 22 are rotatable together with the clutch center 40.

The output-side rotating plates 22 are pushed against the input-side rotating plates 20. The output-side rotating plates 22 are ring-shaped flat plates. Each of the output-side rotating plates 22 is shaped by punching a thin plate of an SPCC material into a ring shape. The front and back surfaces of the output-side rotating plates 22 have grooves with depths of several micrometers to several tens of micrometers, for example, to hold clutch oil. The front and back surfaces of the output-side rotating plates 22 are subjected to a surface hardening treatment to enhance abrasion resistance. The friction members provided on the input-side rotating plates 20 may be provided on the output-side rotating plates 22 instead of the input-side rotating plates 20, or may be provided on both the input-side rotating plates 20 and the output-side rotating plates 22.

Figure 3:
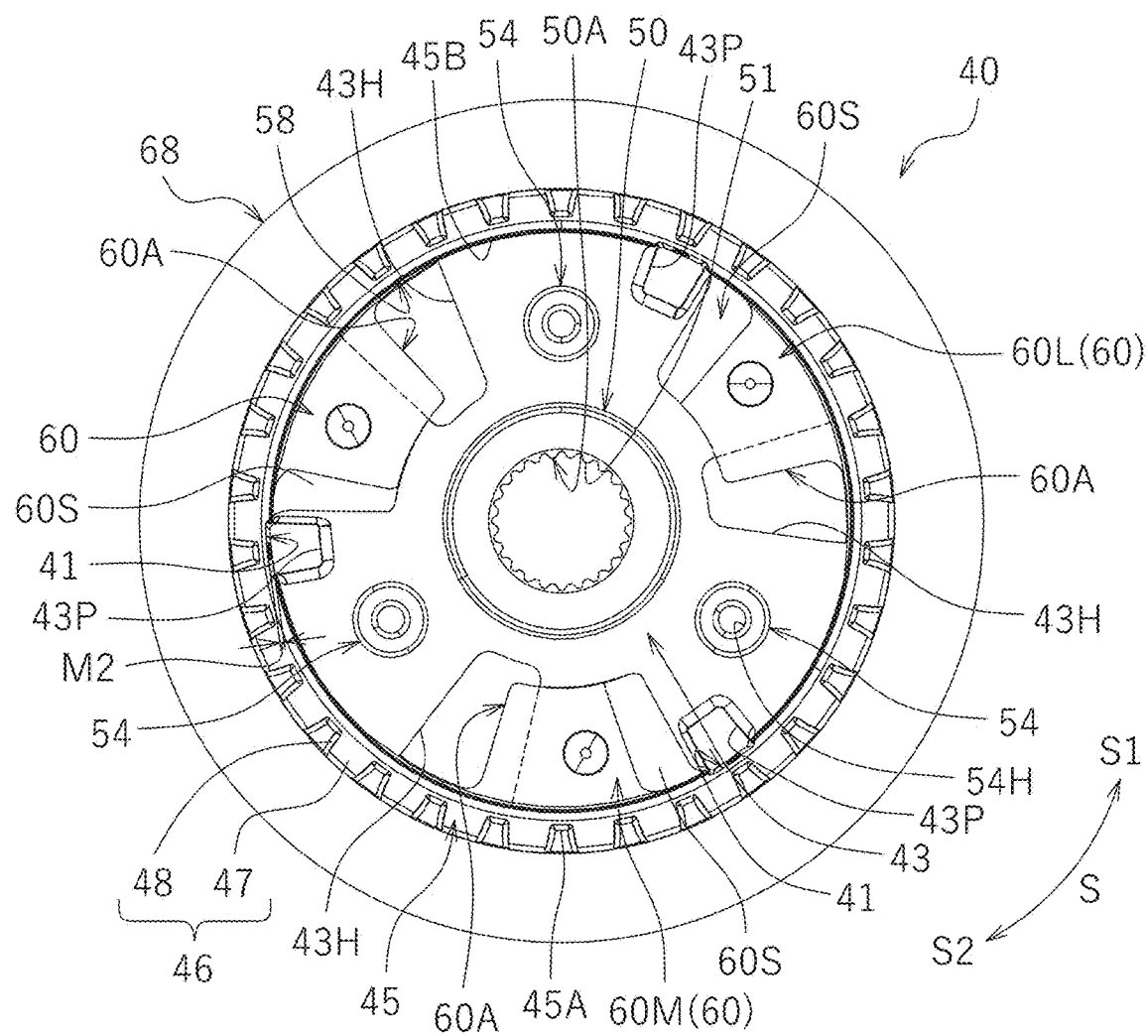
FIG. 3 is a plan view of a clutch center according to the first preferred embodiment of the present invention.

Each of the center-side cam portions 60 has a trapezoidal shape including a cam surface including a slope defining an assist & slipper (registered trademark) mechanism that generates an assist torque as a force of increasing a pressing force (contact pressure force) between the input-side rotating plates 20 and the output-side rotating plates 22 or a slipper torque as a force of separating the input-side rotating plates 20 and the output-side rotating plates 22 from each other early and shifting these plates into a half-clutch state. The center-side cam portions 60 project from the base wall 43 in the second direction D2. As illustrated in FIG. 3, the center-side cam portions 60 are arranged at regular or substantially regular intervals in the circumferential directions S of the clutch center 40. In this preferred embodiment, the clutch center 40 includes three center-side cam portions 60, but the number of the center-side cam portions 60 is not limited to three.

As illustrated in FIG. 3, the center-side cam portions 60 are located radially outward of the output shaft holding portion 50. Each of the center-side cam portions 60 includes the center-side assist cam surface 60A and the center-side slipper cam surface 60S. The center-side assist cam surface 60A is configured to generate a force in a direction from the pressure plate 70 toward the clutch center 40 in order to increase a pressing force (contact pressure force) between the input-side rotating plates 20 and the output-side rotating plates 22 in relative rotation to the pressure plate 70. In this preferred embodiment, when this force is generated, the position of the pressure plate 70 to the clutch center 40 does not change, and the pressure plate 70 does not need to approach the clutch center 40 physically. The pressure plate 70 may be physically displaced with respect to the clutch center 40. The center-side slipper cam surface 60S is configured to separate the pressure plate 70 from the clutch center 40 in order to reduce the pressing force (contact pressure force) between the input-side rotating plates 20 and the output-side rotating plates 22 in relative rotation to the pressure plate 70. In the center-side cam portions 60 adjacent to each other in the circumferential directions S, the center-side assist cam surface 60A of one center-side cam portion 60L and the center-side slipper cam surface 60S of the other center-side cam portion 60M are opposed to each other in the circumferential directions S.

As illustrated in FIG. 2, the clutch center 40 includes the plurality of (for example, three in this preferred embodiment) bosses 54. The bosses 54 support the pressure plate 70. The plurality of bosses 54 are arranged at regular or substantially regular intervals in the circumferential directions S. Each of the bosses 54 has a cylindrical shape. The bosses 54 are located radially outward of the output shaft holding portion 50. The bosses 54 extend toward the pressure plate 70 (i.e., in the second direction D2). The bosses 54 are disposed on the base wall 43. The bosses 54 have screw holes 54H in which bolts 28 (see FIG. 1) are inserted. The screw holes 54H extend in the axial directions of the clutch center 40.

As illustrated in FIGS. 2 and 3, the clutch center 40 includes center-side cam holes 43H penetrating a portion of the base wall 43. The center-side cam holes 43H penetrate the base wall 43 in the directions D. The center-side cam holes 43H extend from portions on the side of the output shaft holding portion 50 to the outer peripheral wall 45. Each of the center-side cam holes 43H is formed between the center-side assist cam surface 60A of the center-side cam portion 60 and the boss 54. When seen in the axial direction of the clutch center 40, the center-side assist cam surface 60A overlaps with a portion of the center-side cam hole 43H.

As illustrated in FIGS. 2 and 3, the clutch center 40 includes through holes 43P penetrating a portion of the base wall 43. The through holes 43P penetrate the base wall 43 in the directions D. Each of the through hole 43P is formed between the center-side slipper cam surface 60S of the center-side cam portion 60 and the center-side cam hole 43H. The through hole 43P is located ahead of the center-side slipper cam surface 60S in the first circumferential direction S1. The through hole 43P is located ahead of the boss 54 in the second circumferential direction S2. The oil flow holes 49 are formed radially outward of the through holes 43P. The through holes 43P are smaller than the center-side cam holes 43H. The through holes 43P causes the inside and outside of the clutch center 40 to communicate with each other. The through holes 43P are configured to guide clutch oil flowing outside the clutch center 40 to the inside of the clutch center 40. More specifically, as indicated by arrow FS in FIG. 1, clutch oil that has flowed out from the output shaft 15 toward the clutch center 40 flows into the clutch center 40 through the through holes 43P.

As illustrated in FIG. 2, the center-side fitting portion 58 is located radially outward of the output shaft holding portion 50. The center-side fitting portion 58 is located radially outward of the center-side cam portions 60. The center-side fitting portion 58 is disposed ahead of the center-side cam portions 60 in the second direction D2. The center-side fitting portion 58 is formed on the inner peripheral surface of the outer peripheral wall 45. The center-side fitting portion 58 is slidably fitted onto a pressure-side fitting portion 88 (see FIG. 4) described later. The inner diameter of the center-side fitting portion 58 has a fitting tolerance allowing distribution of clutch oil flowing out of a distal end 15T of the output shaft 15 to the pressure-side fitting portion 88. That is, a gap is formed between the center-side fitting portion 58 and the pressure-side fitting portion 88 described later. In this preferred embodiment, for example, the center-side fitting portion 58 has an inner diameter larger than the outer diameter of the pressure-side fitting portion 88 by about 0.1 mm. This dimensional tolerance between the inner diameter of the center-side fitting portion 58 and the outer diameter of the pressure-side fitting portion 88 is appropriately set in accordance with the amount of clutch oil intended to be distributed, and is, for example, about 0.1 mm or more and about 0.5 mm or less.

As illustrated in FIG. 2, the clutch center 40 includes the oil passage 41 that guides clutch oil to the center-side fitting portion 58. At least a portion of the oil passage 41 is formed in the inner peripheral surface 45B of the outer peripheral wall 45. The oil passage 41 includes the center-side recesses 41H recessed radially outward from the inner peripheral surface 45B of the outer peripheral wall 45. The center-side recesses 41H include a first center-side recess 41HA located at a side of the center-side assist cam surface 60A in the circumferential directions S, and the second center-side recess 41HB located at a side of the center-side slipper cam surface 60S in the circumferential directions S.

As illustrated in FIG. 2, the first center-side recess 41HA guides clutch oil to the center-side fitting portion 58. The first center-side recess 41HA is located ahead of the center-side assist cam surface 60A in the second circumferential direction S2. The first center-side recess 41HA is located ahead of the boss 54 in the first circumferential direction S1. The first center-side recess 41HA is located radially outward of the center-side cam hole 43H. The first center-side recess 41HA is continuous with the center-side cam hole 43H. The first center-side recess 41HA is formed in a portion of the inner peripheral surface 45B of the outer peripheral wall 45 in the directions D. The second center-side recess 41HB guides clutch oil to the center-side fitting portion 58. The second center-side recess 41HB is located ahead of the center-side slipper cam surface 60S in the first circumferential direction S1.

As illustrated in FIG. 2, the second center-side recess 41HB is located ahead of the boss 54 in the second circumferential direction S2. The second center-side recess 41HB is located radially outward of the through hole 43P. The second center-side recess 41HB is continuous with the through hole 43P. The second center-side recess 41HB is formed in the entire inner peripheral surface 45B of the outer peripheral wall 45 in the directions D. A length L3 of the first center-side recess 41HA in the circumferential directions S (see FIG. 11) is longer than a length L4 of the second center-side recess 41HB in the circumferential directions S (see FIG. 12). A length of the first center-side recess 41HA in the directions D is smaller than a length of the second center-side recess 41HB in the directions D.

As illustrated in FIG. 1, the pressure plate 70 is movable toward or away from the clutch center 40 and rotatable relative to the clutch center 40. The pressure plate 70 is configured to press the input-side rotating plates 20 and the output-side rotating plates 22. The pressure plate 70 is disposed coaxially with the clutch center 40 and the clutch housing 30. The pressure plate 70 includes a body 72, and a flange 98 connected to the outer edge of the body 72 on the side of the second direction D2 and extending radially outward. The body 72 projects ahead of the flange 98 in the first direction D1. The pressure plate 70 holds the plurality of output-side rotating plates 22 arranged alternately with the input-side rotating plates 20.

Figure 4:
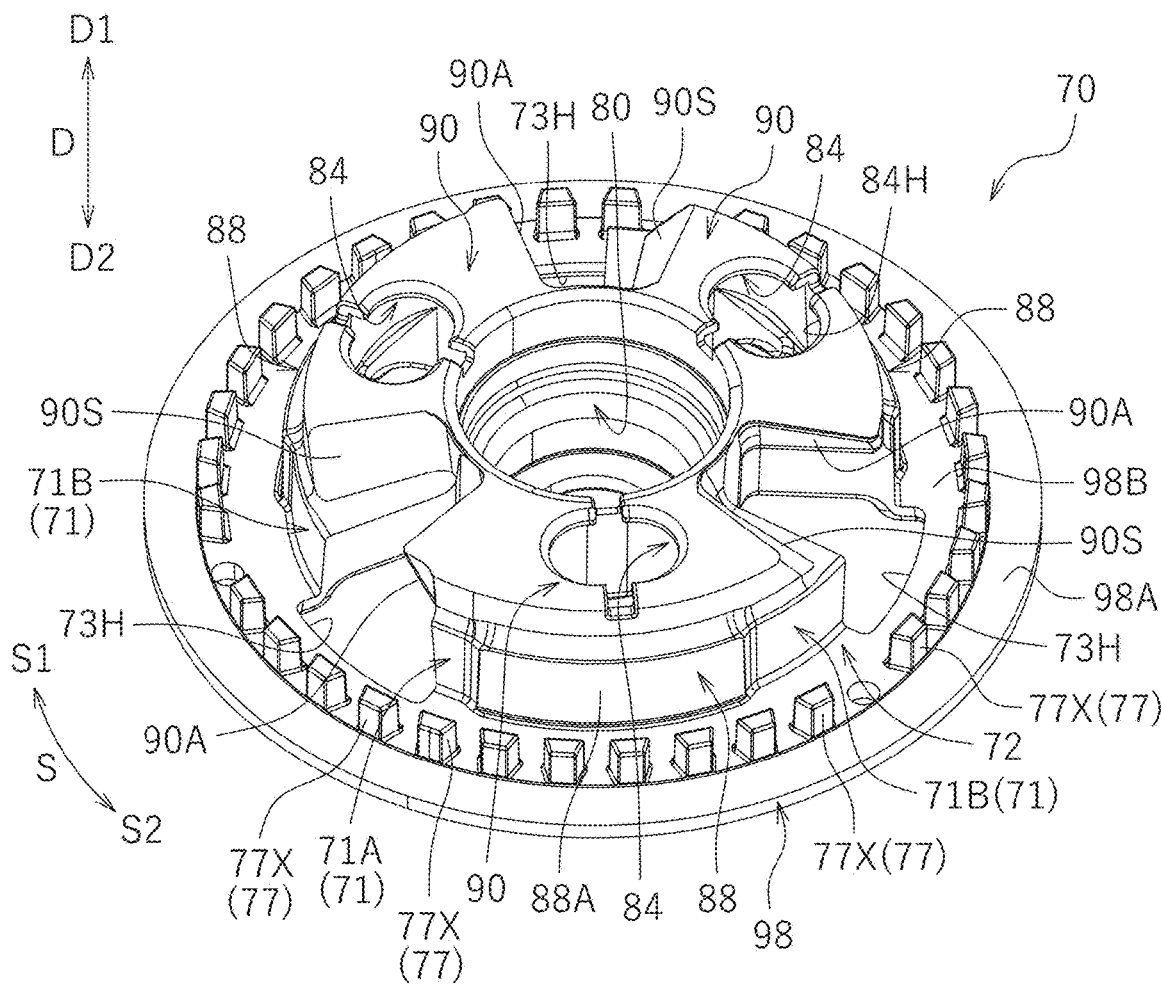
FIG. 4 is a perspective view of a pressure plate according to the first preferred embodiment of the present invention.
Figure 6:
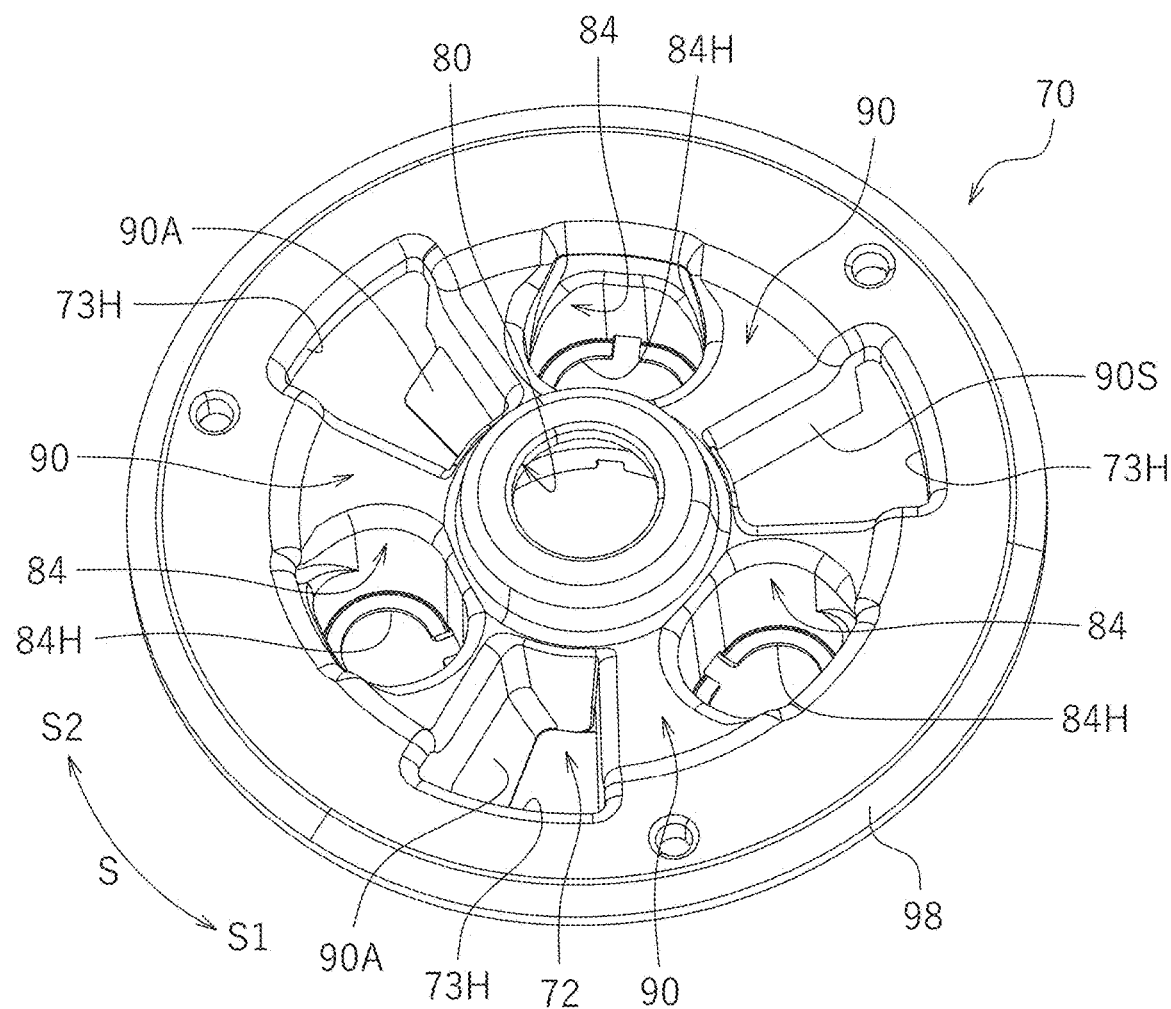
FIG. 6 is a perspective view of a pressure plate according to the first preferred embodiment of the present invention.

As illustrated in FIG. 4, the body 72 includes the cylindrical portion 80, the plurality of pressure-side cam portions 90, the pressure-side fitting portion 88, and a spring housing portion 84 (see also FIG. 6).

As illustrated in FIG. 4, the flange 98 extends radially outward from the outer edge of the pressure-side fitting portion 88. The flange 98 includes a pressing surface 98A that applies a pressing force to the input-side rotating plates 20 and the output-side rotating plates 22 and a connection surface 98B located radially inward of the pressing surface 98A. The connection surface 98B includes pressure-side fitting teeth 77 described later. The connection surface 98B is connected to the pressure-side fitting portion 88. The pressing surface 98A and the connection surface 98B are disposed substantially in parallel to each other. The pressing surface 98A is located ahead of the connection surface 98B in the second direction D2.

The cylindrical portion 80 has a cylindrical shape. The cylindrical portion 80 is integrally formed with the pressure-side cam portions 90. The cylindrical portion 80 houses the distal end 15T of the output shaft 15 (see FIG. 1). The cylindrical portion 80 houses the release bearing 18 (see FIG. 1). The cylindrical portion 80 receives a pressing force from the push member 16B. The cylindrical portion 80 receives clutch oil that has flowed out from the distal end 15T of the output shaft 15.

Figure 5:
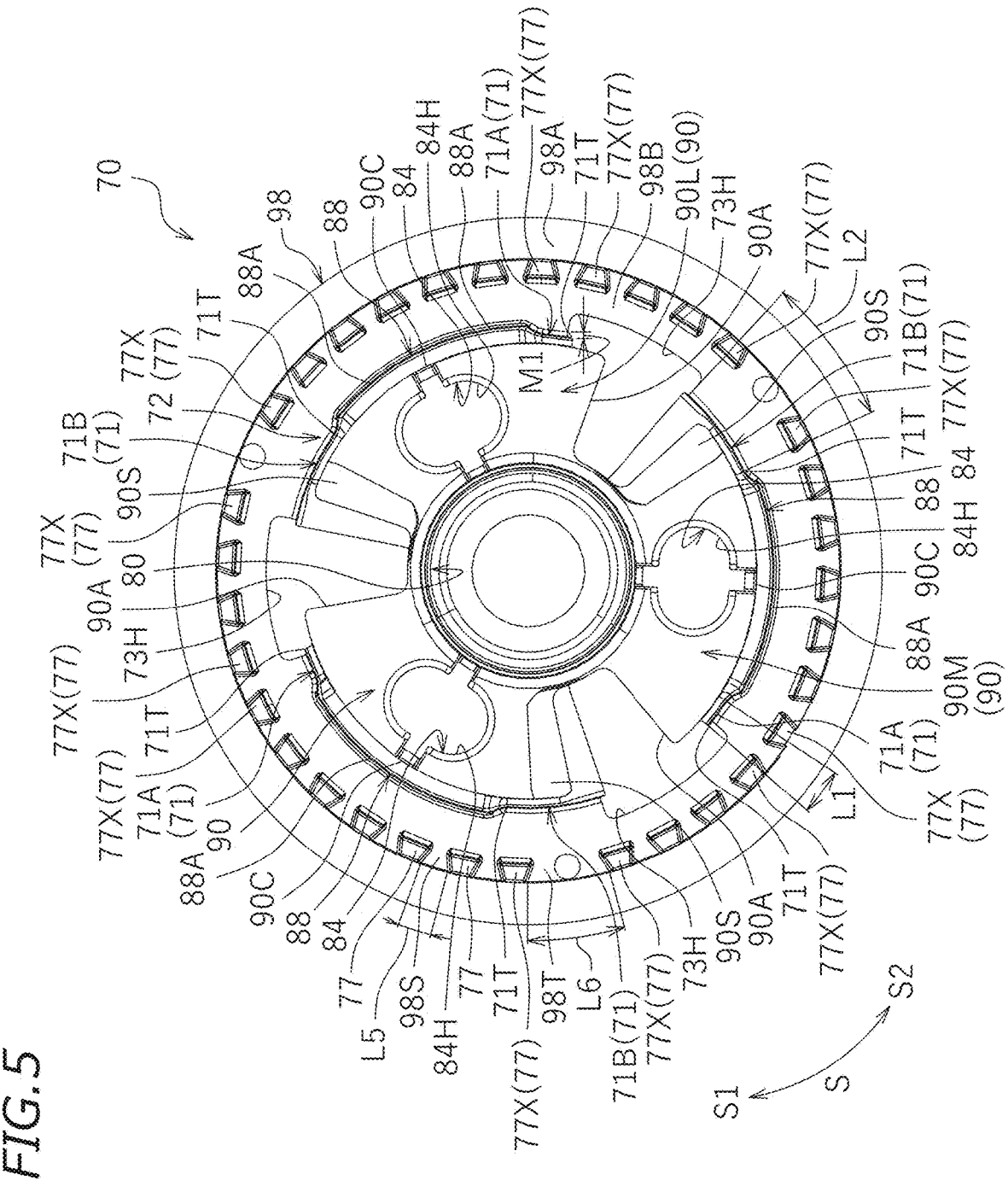
FIG. 5 is a plan view of a pressure plate according to the first preferred embodiment of the present invention.

Each of the pressure-side cam portions 90 has a trapezoidal shape including a cam surface including a slope defining an assist & slipper (registered trademark) mechanism that slides on the center-side cam portions 60 and generates an assist torque or a slipper torque. The pressure-side cam portions 90 project from the flange 98 in the first direction D1. As illustrated in FIG. 5, the pressure-side cam portions 90 are arranged at regular or substantially regular intervals in the circumferential directions S of the pressure plate 70. In this preferred embodiment, the pressure plate 70 includes three pressure-side cam portions 90, but the number of the pressure-side cam portions 90 is not limited to three.

As illustrated in FIG. 5, the pressure-side cam portion 90 is located radially outward of the cylindrical portion 80. Each of the pressure-side cam portions 90 includes a pressure-side assist cam surface 90A (see also FIG. 7) and a pressure-side slipper cam surface 90S. The pressure-side assist cam surface 90A can be brought into contact with the center-side assist cam surface 60A. The pressure-side assist cam surface 90A is configured to generate a force in a direction from the pressure plate 70 toward the clutch center 40 in order to increase a pressing force (contact pressure force) between the input-side rotating plates 20 and the output-side rotating plates 22 in relative rotation to the clutch center 40. The pressure-side slipper cam surface 90S can be brought into contact with the center-side slipper cam surface 60S. The pressure-side slipper cam surface 90S is configured to separate the pressure plate 70 from the clutch center 40 in order to reduce a pressing force (contact pressure force) between the input-side rotating plates 20 and the output-side rotating plates 22 in relative rotation to the clutch center 40. In the pressure-side cam portions 90 adjacent to each other in the circumferential directions S, the pressure-side assist cam surface 90A of one pressure-side cam portion 90L and the pressure-side slipper cam surface 90S of the other pressure-side cam portion 90M are opposed to each other in the circumferential directions S.

Figure 8:
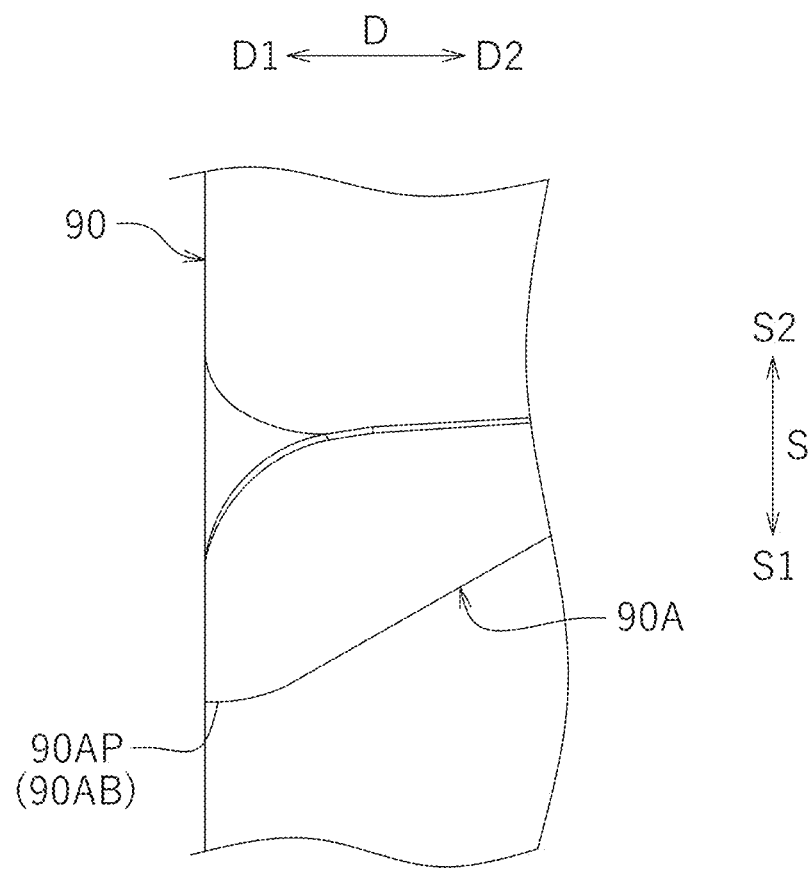
FIG. 8 is an enlarged side view of a portion of a pressure-side cam portion according to the first preferred embodiment of the present invention.

As illustrated in FIG. 8, an end of the pressure-side assist cam surface 90A of each pressure-side cam portion 90 in the circumferential directions S includes a chamfered portion 90AP that is linearly chamfered. A corner of the chamfered portion 90AP (corner on the side of the first direction D1 and the first circumferential direction S1) includes a right angle. More specifically, the chamfered portion 90AP is formed in an end 90AB of the pressure-side assist cam surface 90A in the first circumferential direction S1.

Figure 10A:
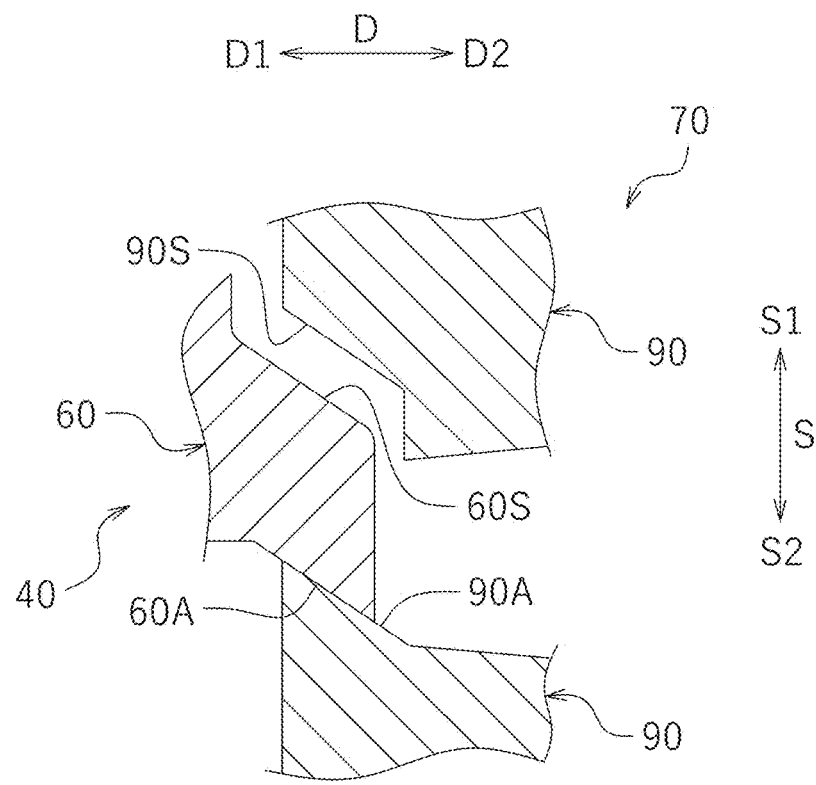
FIG. 10A is a schematic view for describing effects of a center-side assist cam surface and a pressure-side assist cam surface.

Advantages of the center-side cam portions 60 and the pressure-side cam portions 90 will now be described. When the rotation speed of the engine increases so that a rotation driving force input to the input gear 35 and the clutch housing 30 is thereby allowed to be transferred to the output shaft 15 through the clutch center 40, a rotation force in the first circumferential direction S1 is applied to the pressure plate 70, as illustrated in FIG. 10A. Thus, with the effects of the center-side assist cam surface 60A and the pressure-side assist cam surface 90A, a force in first direction D1 is generated in the pressure plate 70. Accordingly, a contact pressure force between the input-side rotating plates 20 and the output-side rotating plates 22 increases.

Figure 10B:
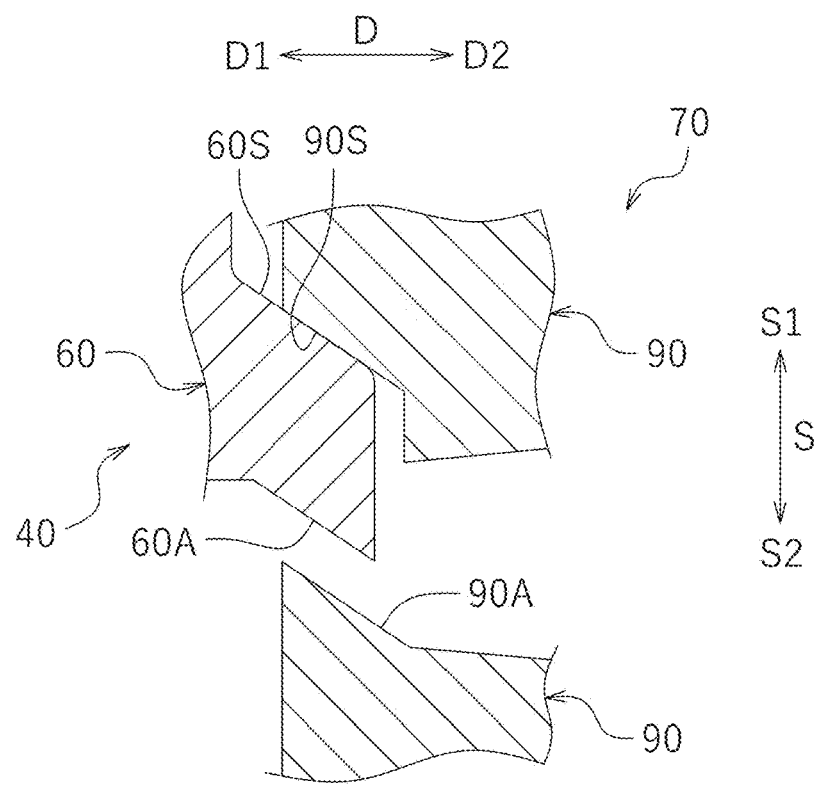
FIG. 10B is a schematic view for describing effects of a center-side slipper cam surface and a pressure-side slipper cam surface.

On the other hand, when the rotation speed of the output shaft 15 exceeds the rotation speed of the input gear 35 and the clutch housing 30 and a back torque is generated, a rotation force in the first circumferential direction S1 is applied to the clutch center 40, as illustrated in FIG. 10B. Thus, with the effects of the center-side slipper cam surface 60S and the pressure-side slipper cam surface 90S, the pressure plate 70 moves in the second direction D2 and releases a contact pressure force between the input-side rotating plates 20 and the output-side rotating plates 22. In this manner, it is possible to avoid problems in the engine and the transmission caused by the back torque.

Figure 7:
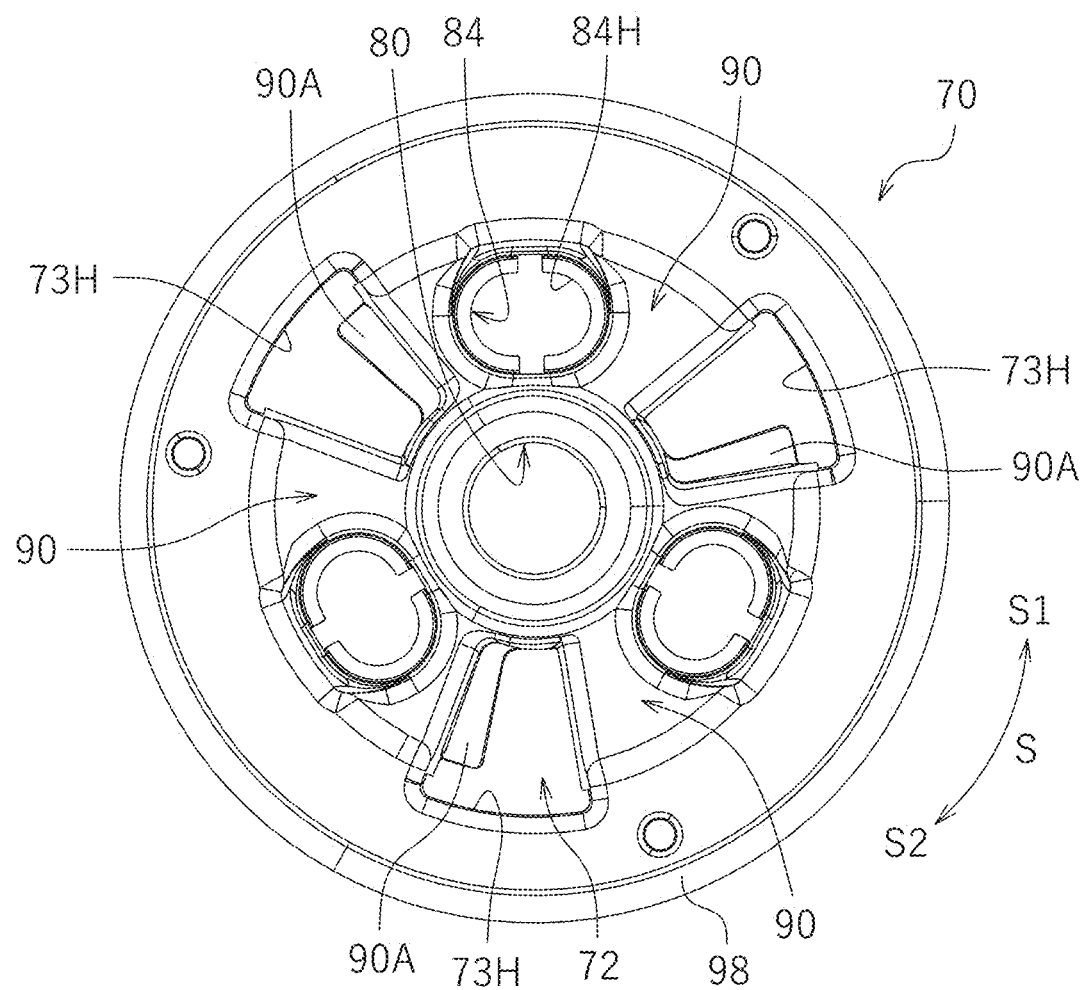
FIG. 7 is a plan view of a pressure plate according to the first preferred embodiment of the present invention.

As illustrated in FIGS. 4 and 5, the pressure plate 70 has pressure-side cam holes 73H penetrating the body 72 and a portion of the flange 98. The pressure-side cam holes 73H are located radially outward of the cylindrical portion 80. The pressure-side cam holes 73H extend from portions on the side of the cylindrical portion 80 to the radially outside of the pressure-side fitting portion 88. Each of the pressure-side cam holes 73H is formed between adjacent ones of the pressure-side cam portions 90. Each of the pressure-side cam holes 73H is formed between the pressure-side assist cam surface 90A and the pressure-side slipper cam surface 90S of adjacent ones of the pressure-side cam portions 90. As illustrated in FIGS. 5 and 7, when seen in the axial direction of the pressure plate 70, the pressure-side assist cam surface 90A overlaps with portions of the pressure-side cam holes 73H.

As illustrated in FIGS. 6 and 7, the spring housing portions 84 are formed in the pressure-side cam portions 90. The spring housing portions 84 are recessed from the second direction D2 in the first direction D1. Each of the spring housing portions 84 has an oval shape. The spring housing portions 84 house pressure springs 25 (see FIG. 1). The spring housing portions 84 include insertion holes 84H which penetrate the spring housing portions 84 and in which the bosses 54 (see FIG. 2) are inserted. That is, the insertion holes 84H penetrate the pressure-side cam portions 90. Each of the insertion holes 84H has an oval shape.

As illustrated in FIG. 1, the pressure springs 25 are housed in the spring housing portions 84. The pressure springs 25 are held by the bosses 54 inserted in the insertion holes 84H of the spring housing portions 84. The pressure springs 25 bias the pressure plate 70 toward the clutch center 40 (i.e., in the first direction D1). The pressure springs 25 are, for example, coil springs obtained by radially winding spring stee.

As illustrated in FIG. 4, the pressure-side fitting portion 88 is located radially outside of the pressure-side cam portions 90. The pressure-side fitting portion 88 is located ahead of the pressure-side cam portions 90 in the second direction D2. The pressure-side fitting portion 88 is configured to slidably fit in the center-side fitting portion 58 (see FIG. 2).

As illustrated in FIGS. 4 and 5, the pressure plate 70 includes pressure-side recesses 71. The pressure-side recesses 71 are formed in an outer peripheral surface 88A of the pressure-side fitting portion 88. The pressure-side recesses 71 are recessed radially inward from the outer peripheral surface 88A over the entire outer peripheral surface 88A in the directions D. A depth M1 of each pressure-side recess 71 in the radial directions is deeper than a depth M2 of each center-side recess 41H in the radial directions (see FIG. 4). When seen in the directions D, the pressure-side recesses 71 are continuous with the pressure-side cam holes 73H. The pressure-side recesses 71 include a first pressure-side recess 71A and a second pressure-side recess 71B.

Figure 11:
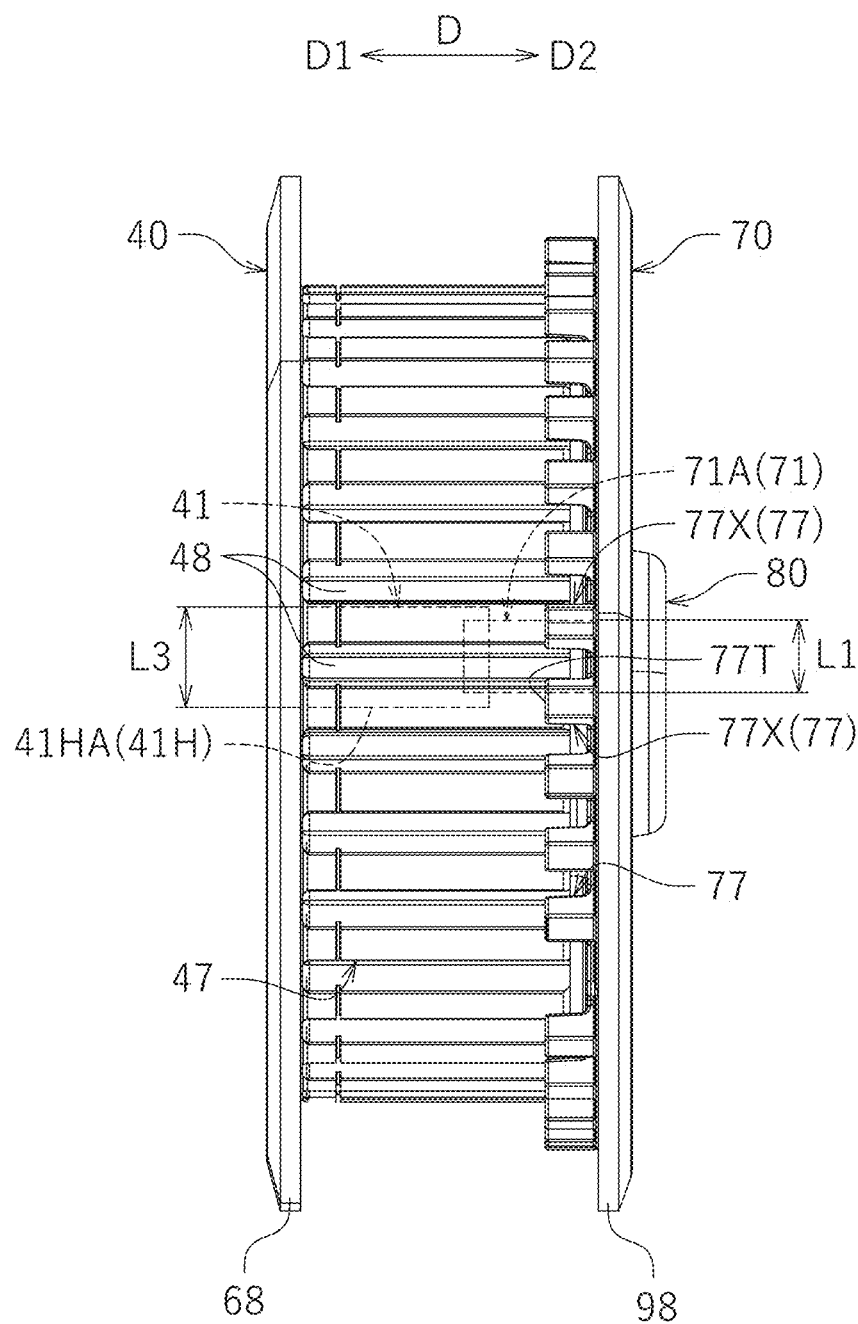
FIG. 11 is a side view of a clutch center and a pressure plate according to a preferred embodiment of the present invention.

As illustrated in FIG. 5, the first pressure-side recess 71A is located closer to the pressure-side assist cam surface 90A than a center 90C of the pressure-side cam portion 90 in the circumferential directions S. The first pressure-side recess 71A is located ahead of the pressure-side assist cam surface 90A in the second circumferential direction S2. As illustrated in FIG. 11, at least a portion of the first pressure-side recess 71A overlaps with the oil passage 41 when seen in the radial directions. In this preferred embodiment, at least a portion of the first pressure-side recess 71A overlaps with the first center-side recess 41HA when seen in the radial directions. The first pressure-side recess 71A communicates with the oil passage 41. The first pressure-side recess 71A communicates with the first center-side recess 41HA. At least a portion of the first pressure-side recess 71A faces the first center-side recess 41HA. The length L3 of the first center-side recess 41HA in the circumferential directions S is longer than a length L1 of the first pressure-side recess 71A in the circumferential directions S. A depth of the first pressure-side recess 71A in the radial directions is deeper than a depth of the first center-side recess 41HA in the radial directions.

Figure 12:
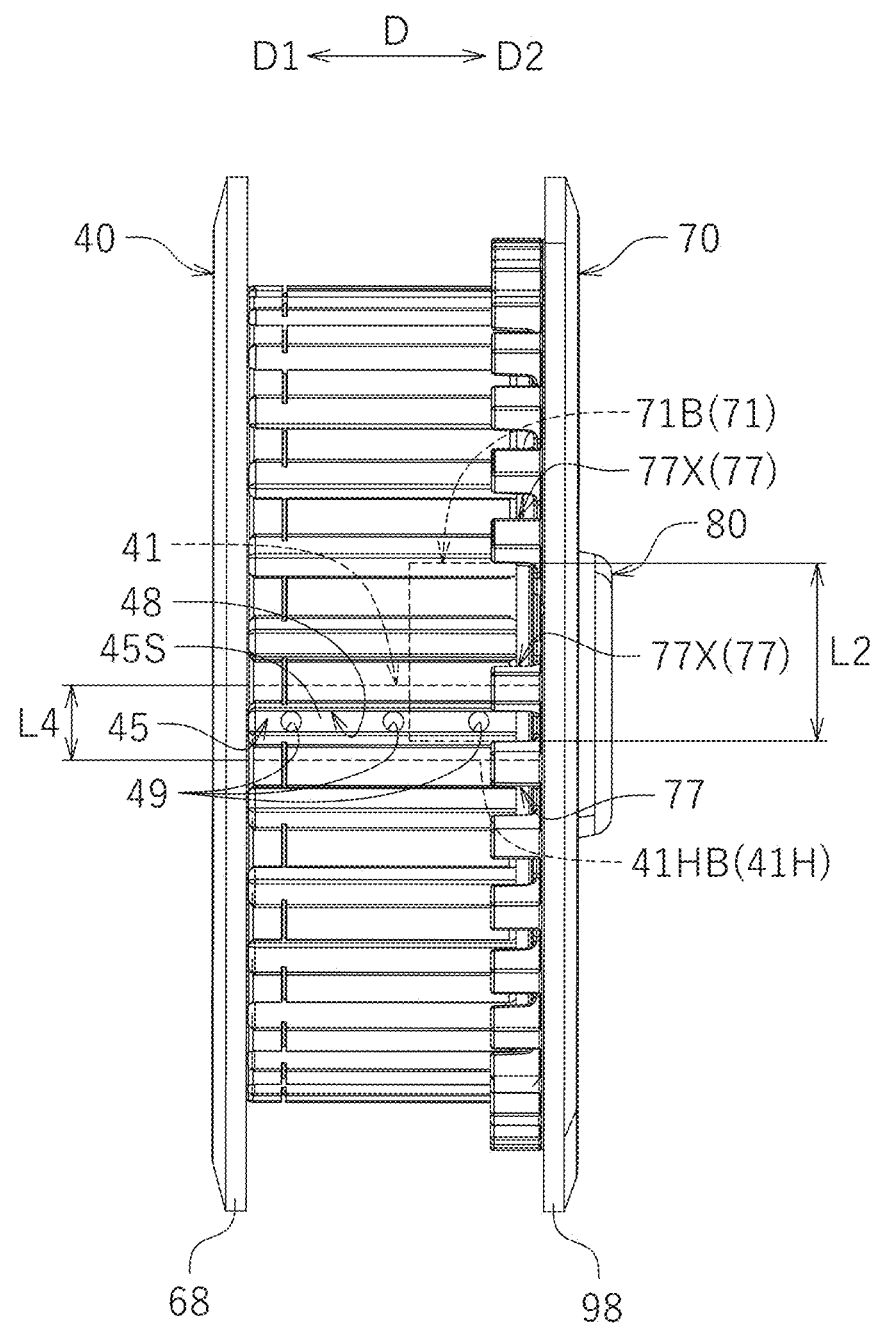
FIG. 12 is a side view of a clutch center and a pressure plate according to a preferred embodiment of the present invention.

As illustrated in FIG. 5, the second pressure-side recess 71B is located closer to the pressure-side slipper cam surface 90S than the center 90C of the pressure-side cam portion 90 in the circumferential directions S. The second pressure-side recess 71B is located radially outward of the pressure-side slipper cam surface 90S. A length L2 of the second pressure-side recess 71B in the circumferential directions S is longer than the length L1 of the first pressure-side recess 71A in the circumferential directions S. As illustrated in FIG. 12, at least a portion of the second pressure-side recess 71B overlaps with the oil passage 41 when seen in the radial directions. In this preferred embodiment, at least a portion of the second pressure-side recess 71B overlaps with the second center-side recess 41HB when seen in the radial directions. The second pressure-side recess 71B communicates with the oil passage 41. The second pressure-side recess 71B communicates with the second center-side recess 41HB. The second pressure-side recess 71B overlaps with at least a portion of the oil flow holes 49 when seen in the radial directions. At least a portion of the second pressure-side recess 71B faces the second center-side recess 41HB. The length L2 of the second pressure-side recess 71B in the circumferential directions S is longer than the length L4 of the second center-side recess 41HB in the circumferential directions S. A depth of the second pressure-side recess 71B in the radial directions is deeper than a depth of the second center-side recess 41HB in the radial directions.

As illustrated in FIG. 4, the pressure plate 70 includes the plurality of pressure-side fitting teeth 77 arranged on the flange 98. The pressure-side fitting teeth 77 hold the input-side rotating plates 20 and the output-side rotating plates 22. The pressure-side fitting teeth 77 are located radially outward of the cylindrical portion 80. The pressure-side fitting teeth 77 are located radially outward of the pressure-side cam portions 90. The pressure-side fitting teeth 77 are located radially outward of the pressure-side fitting portion 88. The pressure-side fitting teeth 77 are formed on the connection surface 98B of the flange 98. The pressure-side fitting teeth 77 project in the first direction D1 from the connection surface 98B. The pressure-side fitting teeth 77 are arranged in the circumferential directions S. The pressure-side fitting teeth 77 are arranged at regular or substantially regular intervals in the circumferential directions S. The pressure-side fitting teeth 77 include oil return fitting teeth 77X. The oil return fitting teeth 77X have the function of returning a portion of clutch oil flowing from the pressure-side recesses 71 radially outward to the pressure-side recesses 71. The oil return fitting teeth 77X are located radially outward of the pressure-side recesses 71. That is, when seen in the radial directions, the oil return fitting teeth 77X overlap at least a portion of the pressure-side recesses 71. As illustrated in FIG. 12, when seen in the radial directions, at least a portion of the spline grooves 48 including the oil flow holes 49 overlaps with the oil return fitting teeth 77X. In this preferred embodiment, since a portion of the pressure-side fitting teeth 77 has been removed, the interval of this portion is enlarged, but the other adjacent pressure-side fitting teeth 77 are arranged at regular or substantially regular intervals. That is, as illustrated in FIG. 5, the flange 98 includes a first portion 98S in which a distance between adjacent pressure-side fitting teeth 77 in the circumferential directions S is a first length L5 and a second portion 98T having a second length L6 longer than the first length L5. The second portion 98T is located ahead, in the second circumferential direction S2, of an end 71T of the pressure-side recess 71 in the first circumferential direction S1. In this preferred embodiment, the second portion 98T is located ahead, in the second circumferential direction S2, of an end 71T of the first pressure-side recess 71A in the first circumferential direction S1. The second portion 98T is located ahead, in the second circumferential direction S2, of the end 71T of the second pressure-side recess 71B in the first circumferential direction S1.

Figure 9:
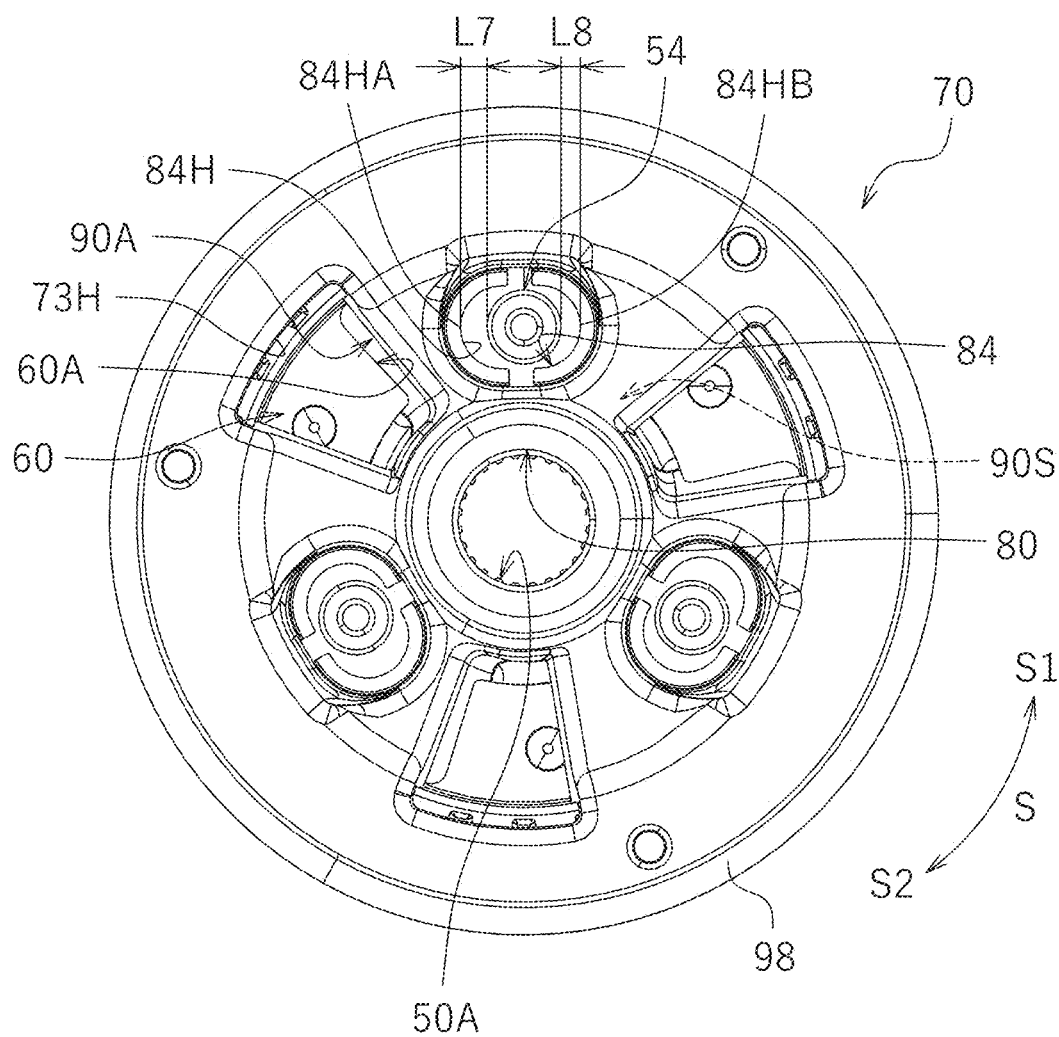
FIG. 9 is a plan view illustrating a state where a clutch center according to the first preferred embodiment of the present invention and a pressure plate are combined.

FIG. 9 is a plan view illustrating a state where the clutch center 40 and the pressure plate 70 are combined. In the state illustrated in FIG. 9, the pressure-side assist cam surface 90A and the center-side assist cam surface 60A do not contact each other, and the pressure-side slipper cam surface 90S and the center-side slipper cam surface 60S do not contact each other. At this time, the pressure plate 70 is closest to the clutch center 40. In the state illustrated in FIG. 9 (in the state of assembly), a distance L7 in the circumferential directions S between the boss 54 and an end 84HA of the insertion holes 84H toward the pressure-side assist cam surface 90A (i.e., ahead in the first circumferential direction S1) in the normal state is smaller than a distance L8 in the circumferential direction S between the boss 54 and an end 84HB of the insertion holes 84H toward the pressure-side slipper cam surface 90S (i.e., ahead in the second circumferential direction S2) in the normal state.

As illustrated in FIG. 1, the stopper plate 100 can contact the pressure plate 70. The stopper plate 100 reduces or prevents separation of the pressure plate 70 from the clutch center 40 by a predetermined distance or more in the second direction D2. The stopper plate 100 is fixed to the bosses 54 of the clutch center 40 with the bolts 28. The pressure plate 70 is fixed by fastening the bolts 28 to the bosses 54 through the stopper plate 100 with the bosses 54 and the pressure springs 25 of the clutch center 40 disposed in the spring housing portions 84. The stopper plate 100 is substantially triangular in plan view.

When the pressure plate 70 is brought into contact with the stopper plate 100, the pressure-side slipper cam surface 90S and the center-side slipper cam surface 60S are in contact with each other in an area of about 50% or more and about 90% or less of the area of the pressure-side slipper cam surface 90S and about 50% or more and about 90% or less of the area of the center-side slipper cam surface 60S, for example. When the pressure plate 70 is brought into contact with the stopper plate 100, the pressure springs 25 are separated from the side walls of the spring housing portions 84. That is, the pressure springs 25 are not sandwiched between the bosses 54 and the spring housing portions 84, and application of excessive stress to the bosses 54 is reduced or prevented.

The clutch device 10 is filled with a predetermined amount of clutch oil. Clutch oil is distributed in the clutch center 40 and the pressure plate 70 through the hollow portion 15H of the output shaft 15, and then is supplied to the input-side rotating plates 20 and the output-side rotating plates 22 through the gap between the center-side fitting portion 58 and the pressure-side fitting portion 88 (e.g., the center-side recesses 41H and the pressure-side recesses 71) and the oil flow holes 49. Clutch oil is also distributed from the outside of the clutch center 40 through the hollow portion 15H of the output shaft 15 into the clutch center 40 through the through hole 43P and the pressure-side cam hole 73H. Clutch oil reduces or prevents absorption of heat and abrasion of the friction members. The clutch device 10 according to this preferred embodiment is a so-called multiplate wet friction clutch device.

Operation of the clutch device 10 according to this preferred embodiment will now be described. As described above, the clutch device 10 is disposed between the engine and the transmission of the motorcycle, and allows or interrupts transfer of a rotation driving force of the engine to the transmission by driver's operation of a clutch operation lever.

In the clutch device 10, in a case where the driver of the motorcycle does not operate the clutch operation lever, a clutch release mechanism (not shown) does not press the push rod 16A, and thus, the pressure plate 70 presses the input-side rotating plates 20 with a biasing force (elastic force) of the pressure springs 25. Accordingly, the clutch center 40 enters a clutch-ON state in which the input-side rotating plates 20 and the output-side rotating plates 22 are pushed against each other to be friction coupled, and is rotationally driven. That is, a rotation driving force of the engine is transferred to the clutch center 40, and the output shaft 15 is rotationally driven.

In the clutch-ON state, clutch oil distributed in the hollow portion 15H of the output shaft 15 and having flowed out from the distal end 15T of the output shaft 15 is dropped or spattered in the cylindrical portion 80 and attached to the cylindrical portion 80 (see arrow F in FIG. 1). The clutch oil attached to the inside of the cylindrical portion 80 is guided into the clutch center 40. Accordingly, clutch oil flows out of the clutch center 40 through the oil flow holes 49. Clutch oil also flows out of the clutch center 40 through the gap between the center-side fitting portion 58 and the pressure-side fitting portion 88 (e.g., the center-side recesses 41H and the pressure-side recesses 71). Then, clutch oil that has flowed out of the clutch center 40 is supplied to the input-side rotating plates 20 and the output-side rotating plates 22.

On the other hand, in the clutch device 10, when the driver of the motorcycle operates the clutch operation lever in the clutch-ON state, the clutch release mechanism (not shown) presses the push rod 16A, and thus, the pressure plate 70 is displaced in a direction away from the clutch center 40 (second direction D2) against a biasing force of the pressure springs 25. Accordingly, the clutch center 40 enters a clutch-OFF state in which friction coupling between the input-side rotating plates 20 and the output-side rotating plates 22 is canceled, and thus, rotational driving attenuates or stops. That is, a rotation driving force of the engine is interrupted to the clutch center 40.

In the clutch-OFF state, clutch oil distributed in the hollow portion 15H of the output shaft 15 and having flowed out of the distal end 15T of the output shaft 15 is guided into the clutch center 40 in the same or substantially the same manner as in the clutch-ON state. At this time, since the pressure plate 70 is separated from the clutch center 40, the amount of fitting between the pressure plate 70 and each of the center-side fitting portion 58 and the pressure-side fitting portion 88 decreases. As a result, clutch oil in the cylindrical portion 80 actively flows out of the clutch center 40, and is distributed to portions in the clutch device 10. In particular, clutch oil can be actively guided to gaps between the input-side rotating plates 20 and the output-side rotating plates 22 separated from each other.

Then, when the driver cancels the clutch operation lever in the clutch-OFF state, pressing of the pressure plate 70 by the clutch release mechanism (not shown) through the push member 16B is canceled, and thus, the pressure plate 70 is displaced with a biasing force of the pressure springs 25 to a direction (first direction D1) of approaching the clutch center 40.

As described above, in the clutch device 10 according to this preferred embodiment, the pressure-side recesses 71 communicate with the oil passage 41. Thus, clutch oil flowing in the oil passage 41 also flows in the pressure-side recesses 71. The pressure-side recesses 71 are recessed radially inward from the outer peripheral surface 88A of the pressure-side fitting portion 88 over the entire outer peripheral surface 88A in the directions D. Thus, a larger amount of clutch oil can be discharged to the outside of the clutch center 40 through the pressure-side recesses 71. That is, a larger amount of clutch oil can be supplied to the input-side rotating plates 20 and the output-side rotating plates 22. In addition, since the pressure-side recesses 71 are continuous with the pressure-side cam holes 73H when seen in the directions D, when clutch oil flows from the outside of the clutch center 40 into the clutch center 40 through the pressure-side cam holes 73H, for example, the clutch oil that has flowed in the clutch center 40 is held in the pressure-side recesses 71. Accordingly, clutch oil can be supplied from the pressure-side recesses 71 to the input-side rotating plates 20 and the output-side rotating plates 22.

In the clutch device 10 according to this preferred embodiment, each of the pressure-side cam portions 90 includes the pressure-side assist cam surface 90A and the pressure-side slipper cam surface 90S, the pressure-side assist cam surface 90A and the pressure-side slipper cam surface 90S are arranged in the circumferential directions S, and the pressure-side recesses 71 includes the first pressure-side recess 71A located closer to the pressure-side assist cam surface 90A than the center 90C of the pressure-side cam portion 90 in the circumferential directions. In this configuration, a larger amount of clutch oil can be supplied to the pressure-side assist cam surface 90A through the first pressure-side recess 71A.

In the clutch device 10 according to this preferred embodiment, the pressure-side recesses 71 include the second pressure-side recess 71B located closer to the pressure-side slipper cam surface 90S than the center 90C of the pressure-side cam portion 90 in the circumferential directions S. In this configuration, a larger amount of clutch oil can be supplied to the pressure-side slipper cam surface 90S through the second pressure-side recess 71B.

In the clutch device 10 according to this preferred embodiment, the length L2 of the second pressure-side recess 71B in the circumferential directions S is longer than the length L1 of the first pressure-side recess 71A in the circumferential directions S. In this configuration, a larger amount of clutch oil can be supplied to the input-side rotating plates 20 and the output-side rotating plates 22 from the second pressure-side recess 71B with rigidity around the pressure-side assist cam surface 90A of the pressure-side cam portion 90 maintained.

In the clutch device 10 according to this preferred embodiment, the clutch center 40 includes the plurality of center-side cam portions 60 each including the center-side assist cam surface 60A operable to generate a force in a direction from the pressure plate 70 toward the clutch center 40 in order to increase a pressing force between the input-side rotating plates 20 and the output-side rotating plates 22 upon rotation relative to the pressure plate 70, the oil passage 41 includes the center-side recess 41H recessed radially outward from the inner peripheral surface 45B of the outer peripheral wall 45, the center-side recesses 41H include the first center-side recess 41HA located at the side of the center-side assist cam surface 60A in the circumferential directions S, and the length L3 of the first center-side recess 41HA in the circumferential directions S is longer than the length L1 of the first pressure-side recess 71A in the circumferential directions S. In this configuration, a larger amount of clutch oil can be guided to the first center-side recess 41HA.

In the clutch device 10 according to this preferred embodiment, the clutch center 40 includes the plurality of center-side cam portions 60 each including the center-side slipper cam surface 60S operable to cause the pressure plate 70 to move away from the clutch center 40 in order to reduce the pressing force between the input-side rotating plates 20 and the output-side rotating plates 22 upon rotation relative to the pressure plate 70, the oil passage 41 includes the center-side recesses 41H recessed radially outward from the inner peripheral surface 45B of the outer peripheral wall 45, the center-side recesses 41H include the second center-side recess 41HB located at the side of the center-side slipper cam surface 60S in the circumferential directions S, and the length L2 of the second pressure-side recess 71B in the circumferential directions S is longer than the length L4 of the second center-side recess 41HB in the circumferential directions S. In this configuration, clutch oil can be supplied to the input-side rotating plates 20 and the output-side rotating plates 22 from a wider range of the second pressure-side recess 71B in the circumferential directions S.

In the clutch device 10 according to this preferred embodiment, the oil passage 41 includes the center-side recess 41H recessed radially outward from the inner peripheral surface 45B of the outer peripheral wall 45, and the depth M1 of each pressure-side recess 71 in the radial directions is deeper than the depth M2 of each center-side recess 41H in the radial directions. In this configuration, a larger amount of clutch oil can be held in the pressure-side recesses 71 so that a larger amount of clutch oil can be supplied from the pressure-side recesses 71 to the input-side rotating plates 20 and the output-side rotating plates 22.

In the clutch device 10 according to this preferred embodiment, the pressure plate 70 includes the flange 98 extending radially outward from the outer edge of the pressure-side fitting portion 88, and the plurality of pressure-side fitting teeth 77 located on the flange 98, holding the input-side rotating plates 20 and the output-side rotating plates 22, and arranged in the circumferential directions S, the flange 98 includes the pressing surface 98A that applies a pressing force to the input-side rotating plates 20 and the output-side rotating plates 22 and the connection surface 98B including the pressure-side fitting teeth 77, located radially inward of the pressing surface 98A, and connected to the pressure-side fitting portion 88, and the pressing surface 98A and the connection surface 98B are disposed substantially in parallel to each other. In this configuration, since clutch oil from the pressure-side recesses 71 flows on the connection surface 98B and the pressing surface 98A, clutch oil can be supplied to a wider range of the input-side rotating plates 20 and the output-side rotating plates 22.

In the clutch device 10 according to this preferred embodiment, the pressure plate 70 includes the first portion 98S in which a distance between adjacent ones of the pressure-side fitting teeth 77 in the circumferential directions S is the first length L5 and the second portion 98T having the second length L6 longer than the first length L5, and the second portion 98T is located ahead, in the second circumferential direction S2, of the end 71T of the pressure-side recesses 71 in the first circumferential direction S1. In this configuration, clutch oil can be supplied from the first portion 98S and the second portion 98T to the radially outside of the clutch oil in a balanced manner.

In the clutch device 10 according to this preferred embodiment, the clutch center 40 includes the plurality of center-side fitting teeth 47 holding the input-side rotating plates 20 and the output-side rotating plates 22, projecting radially outward from the outer peripheral surface 45A of the outer peripheral wall 45, and arranged in the circumferential directions S, the plurality of spline grooves 48 each located between adjacent ones of the center-side fitting teeth 47, and the oil flow holes 49 located in the spline grooves 48 to penetrate the outer peripheral wall 45 and operable to discharge clutch oil flowing on the inner peripheral surface 45B of the outer peripheral wall 45 to the outside of the clutch center 40, the pressure-side fitting teeth 77 include the oil return fitting teeth 77X located radially outward of the pressure-side recesses 71, and the pressure-side recesses 71 overlap with at least a portion of the oil flow holes 49 when seen in the radial directions. In this configuration, a portion of clutch oil flowing radially outward from the pressure-side recesses 71 is caused to return to the pressure-side recesses 71 by the oil return fitting teeth 77X. At least a portion of the clutch oil that has returned is discharged from the oil flow holes 49 to the outside of the clutch center 40. Thus, clutch oil can be effectively supplied to the input-side rotating plates 20 and the output-side rotating plates 22 held by the center-side fitting teeth 47.

In the clutch device 10 according to this preferred embodiment, when seen in the radial directions, at least a portion of the spline grooves 48 including the oil flow holes 49 overlaps with the oil return fitting teeth 77X. In this configuration, clutch oil caused to return to the pressure-side recesses 71 by the oil return fitting teeth 77X more easily flows to the oil flow holes 49.

Second Preferred Embodiment

Figure 13:
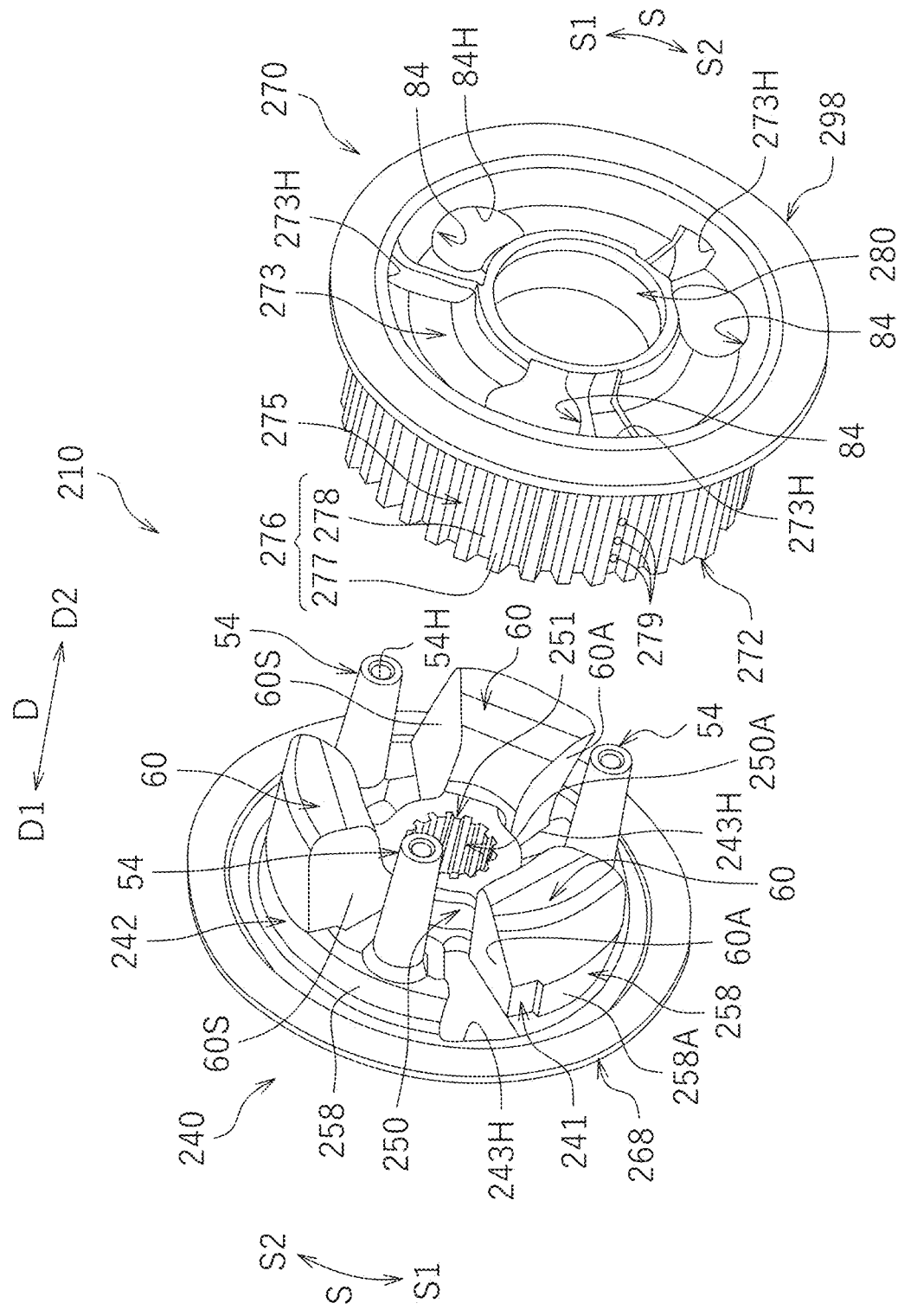
FIG. 13 is a disassembled perspective view of a clutch center and a pressure plate according to another preferred embodiment of the present invention.

FIG. 13 is a disassembled perspective view of a clutch center 240 and a pressure plate 270 of a clutch device 210 according to a second preferred embodiment.

The clutch center 240 is housed in a clutch housing 30 (see FIG. 1). The clutch center 240 and the clutch housing 30 are concentrically disposed. As illustrated in FIG. 13, the clutch center 240 includes a body 242, and a flange 268 connected to an outer edge of the body 242 on the side of a first direction D1 and extending radially outward. The body 242 projects from the flange 268 in a second direction D2. The clutch center 240 does not hold output-side rotating plates 22. The clutch center 240 is rotationally driven together with an output shaft 15 (see FIG. 1).

As illustrated in FIG. 13, the body 242 includes an output shaft holding portion 250, a plurality of center-side cam portions 60, and a center-side fitting portion 258. The center-side cam portions 60 project from the flange 268 in the second direction D2. The center-side cam portions 60 are located radially outward of the output shaft holding portion 250.

The output shaft holding portion 250 has a cylindrical shape. The output shaft holding portion 250 has an insertion hole 251 in which the output shaft 15 (see FIG. 1) is inserted and spline-fitted. The insertion hole 251 penetrates the body 242. An inner peripheral surface 250A of the output shaft holding portion 250 defining the insertion hole 251 has a plurality of spline grooves along the axial direction. The output shaft 15 is coupled to the output shaft holding portion 250.

As illustrated in FIG. 13, the clutch center 240 includes a plurality of (for example, three in this preferred embodiment) bosses 54. The bosses 54 are located radially outward of the output shaft holding portion 250. The bosses 54 are disposed on the body 242.

As illustrated in FIG. 13, the clutch center 240 includes center-side cam holes 243H penetrating the body 242 and a portion of the flange 268. The center-side cam holes 243H penetrate the body 242 and the flange 268 in directions D. The center-side cam holes 243H extend from portions on the side of the output shaft holding portion 250 to the flange 268. The center-side cam holes 243H are formed between the center-side assist cam surfaces 60A of the center-side cam portions 60 and the bosses 54. When seen in the axial direction of the clutch center 240, the center-side assist cam surfaces 60A overlap with a portion of the center-side cam holes 243H.

As illustrated in FIG. 13, the center-side fitting portion 258 is disposed on the body 242. The center-side fitting portion 258 is located radially outward of the center-side cam portions 60. The center-side fitting portion 258 is located ahead of the center-side cam portions 60 in the first direction D1. The center-side fitting portion 258 is configured to slidably fit in the pressure-side fitting portion 288 (see FIG. 14).

As illustrated in FIG. 13, the clutch center 240 includes a center-side recess 241. The center-side recess 241 is formed on an outer peripheral surface 258A of the center-side fitting portion 258. The center-side recess 241 is recessed radially inward from the outer peripheral surface 258A over the entire outer peripheral surface 258A in the directions D. A depth of the center-side recess 241 in the radial directions is deeper than a depth of an oil passage 271 in the radial directions. The center-side recess 241 is continuous with the center-side cam hole 243H when seen in the directions D. The center-side recess 241 is located closer to the center-side assist cam surface 60A than a center of the center-side cam portions 60 in the circumferential directions S. The center-side recess 241 is located ahead of the center-side assist cam surface 60A in the first circumferential direction S1. At least a portion of the center-side recess 241 overlaps with the oil passage 271 when seen in the radial directions. The center-side recess 241 communicates with the oil passage 271.

The pressure plate 270 is movable toward or away from the clutch center 240 and rotatable relative to the clutch center 240. The pressure plate 270 is configured to press the input-side rotating plates 20 and the output-side rotating plates 22. The pressure plate 270 is disposed coaxially with the clutch center 240 and the clutch housing 30. The pressure plate 270 includes a cylindrical body 272, and a flange 298 extending radially outward from the outer edge of the body 272. The pressure plate 270 holds the plurality of output-side rotating plates 22 alternately arranged with the input-side rotating plates 20 in the directions D.

Figure 14:
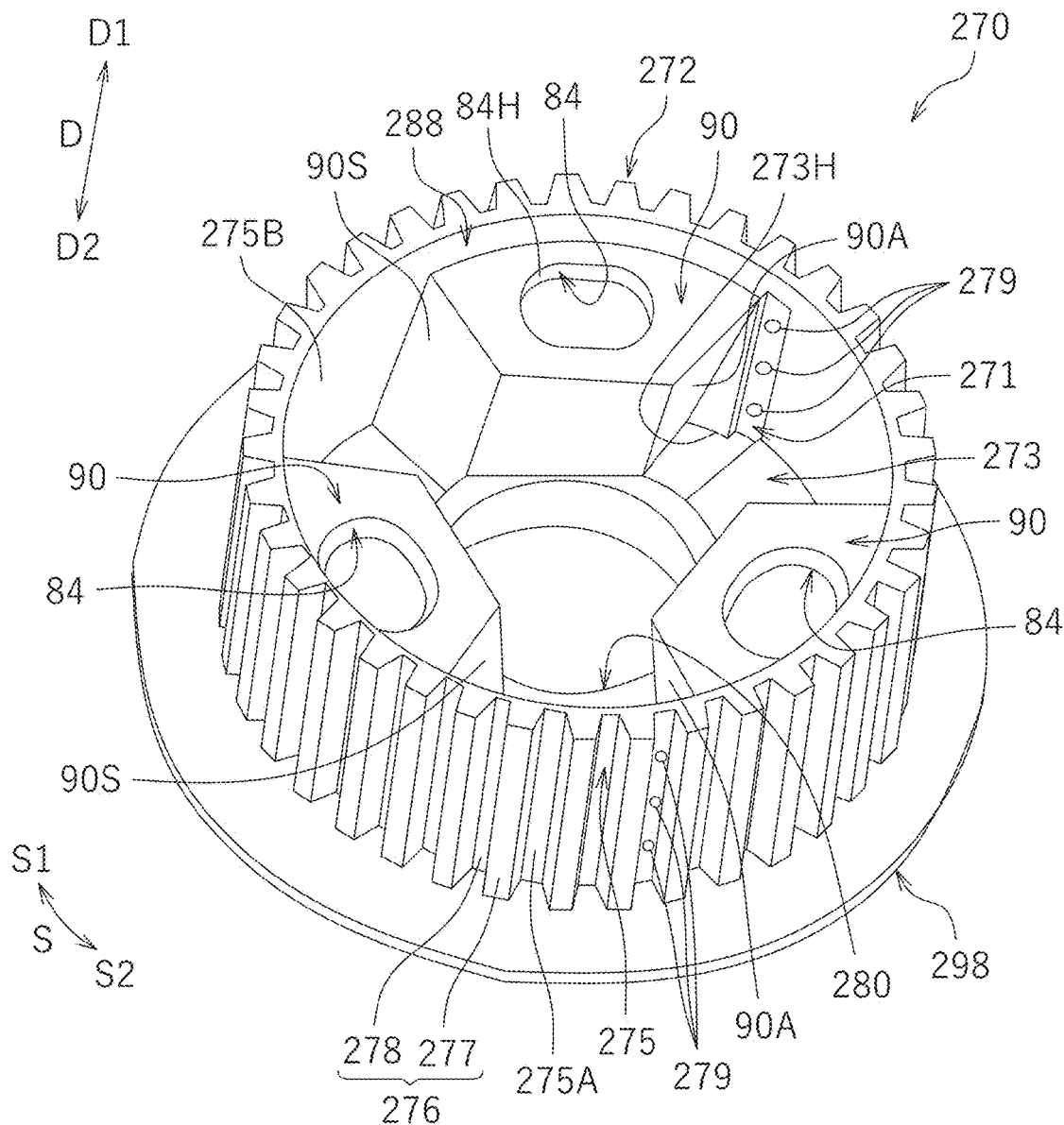
FIG. 14 is a perspective view of a pressure plate according to another preferred embodiment of the present invention.

As illustrated in FIG. 14, the body 272 includes a ring-shaped base wall 273, an outer peripheral wall 275 located radially outward of the base wall 273 and extending in the first direction D1, a cylindrical portion 280 disposed at the center of the base wall 273, a plurality of pressure-side cam portions 90 connected to the base wall 273 and the outer peripheral wall 275, a pressure-side fitting portion 288, and spring housing portions 84 (see FIG. 13). The pressure-side cam portions 90 project from the body 272 in the first direction D1. The pressure-side cam portions 90 are located radially outward of the cylindrical portion 280. The pressure-side cam portions 90 are located radially inward of the outer peripheral wall 275.

The cylindrical portion 280 has a cylindrical shape. The cylindrical portion 280 is formed integrally with the pressure-side cam portions 90. The cylindrical portion 280 houses a distal end 15T of the output shaft 15 (see FIG. 1). The cylindrical portion 280 houses a release bearing 18 (see FIG. 1). The cylindrical portion 280 receives a pressing force from a push member 16B. The cylindrical portion 280 receives clutch oil that has flowed out from the distal end 15T of the output shaft 15.

As illustrated in FIG. 14, the outer peripheral wall 275 of the pressure plate 270 is located radially outward of the cylindrical portion 280. The outer peripheral wall 275 has a ring shape extending in the directions D. An outer peripheral surface 275A of the outer peripheral wall 275 has a spline fitting portion 276. The spline fitting portion 276 includes a plurality of pressure-side fitting teeth 277 extending in the axial direction of the pressure plate 270 along the outer peripheral surface 275A of the outer peripheral wall 275, a plurality of spline grooves 278 each formed between adjacent ones of the pressure-side fitting teeth 277 and extending in the axial direction of the pressure plate 270, and oil flow holes 279. The pressure-side fitting teeth 277 hold the output-side rotating plates 22. The plurality of pressure-side fitting teeth 277 are arranged in the circumferential directions S. The plurality of pressure-side fitting teeth 277 are arranged at regular or substantially regular intervals in the circumferential directions S. The plurality of pressure-side fitting teeth 277 have the same or substantially the same shape. The pressure-side fitting teeth 277 project radially outward from the outer peripheral surface 275A of the outer peripheral wall 275. The oil flow holes 279 penetrate the outer peripheral wall 275 in the radial directions. Each of the oil flow holes 279 is formed between adjacent ones of the pressure-side fitting teeth 277. That is, the oil flow holes 279 are formed in the spline grooves 278. The oil flow holes 279 are formed at the sides of the pressure-side cam portions 90. The oil flow holes 279 are formed at the sides of pressure-side assist cam surfaces 90A of the pressure-side cam portions 90. The oil flow holes 279 are located ahead of the pressure-side assist cam surfaces 90A in the first circumferential direction S1. The oil flow holes 279 are located ahead of pressure-side slipper cam surfaces 90S in the second circumferential direction S2. The oil flow holes 279 are formed in an oil passage 271 described later. In this preferred embodiment, three oil flow holes 279 are formed in each of three portions of the peripheral wall 275 in the circumferential directions S. The oil flow holes 279 are arranged at regular or substantially intervals in the circumferential directions S. The oil flow holes 279 cause the inside and outside of the pressure plate 270 to communicate with each other. The oil flow holes 279 allow clutch oil that has flowed out of the output shaft 15 into the pressure plate 270 to be discharged to the outside of the pressure plate 270. In this preferred embodiment, the oil flow holes 279 allow clutch oil flowing at an inner peripheral surface 275B of the peripheral wall 275 to be discharged to the outside of the pressure plate 270. At least a portion of the oil flow holes 279 is located at a position facing the center-side fitting portion 258 (see FIG. 13).

The output-side rotating plates 22 are held by the spline fitting portion 276 of the pressure plate 270. The output-side rotating plates 22 are held by the pressure-side fitting teeth 277 and the spline grooves 278 by spline-fitting. The output-side rotating plates 22 are displaceable along the axial direction of the pressure plate 270. The output-side rotating plates 22 are rotatable together with the pressure plate 270.

As illustrated in FIGS. 13 and 14, the pressure plate 270 includes pressure-side cam holes 273H penetrating a portion of the base wall 273. The pressure-side cam holes 273H penetrate the base wall 273 in the directions D. The pressure-side cam holes 273H are located radially outward of the cylindrical portion 80. The pressure-side cam holes 273H extend from the sides of the cylindrical portion 80 to the outer peripheral wall 275. Each of the pressure-side cam holes 273H penetrates a portion between adjacent ones of the pressure-side cam portions 90. Each of the pressure-side cam holes 273H penetrates a portion between the pressure-side assist cam surface 90A and the pressure-side slipper cam surface 90S of adjacent ones of the pressure-side cam portions 90. When seen in the axial direction of the pressure plate 270, the pressure-side assist cam surfaces 90A overlap with a portion of the pressure-side cam holes 273H. Clutch oil flows into the pressure-side cam holes 273H from the outside of the pressure plate 270.

As illustrated in FIG. 14, the pressure-side fitting portion 288 is located radially outward of the cylindrical portion 280. The pressure-side fitting portion 288 is located radially outward of the pressure-side cam portions 90. The pressure-side fitting portion 288 is located ahead of the pressure-side cam portions 90 in the first direction D1. The pressure-side fitting portion 288 is formed on the inner peripheral surface 275B of the peripheral wall 275. The pressure-side fitting portion 288 is configured to slidably fit onto the center-side fitting portion 258 (see FIG. 13). A gap is formed between the pressure-side fitting portion 288 and the center-side fitting portion 258.

As illustrated in FIG. 14, the pressure plate 270 includes the oil passage 271 that guides clutch oil to the pressure-side fitting portion 288. At least a portion of the oil passage 271 is formed in the inner peripheral surface 275B of the outer peripheral wall 275. The oil passage 271 is recessed radially outward from the inner peripheral surface 275B. The oil passage 271 is formed in a portion of the inner peripheral surface 275B in the directions D. The oil passage 271 is located radially outward of the pressure-side cam holes 273H. The oil passage 271 is continuous with the pressure-side cam holes 273H. The oil passage 271 is located ahead of the pressure-side assist cam surface 90A in the first circumferential direction S1. The oil passage 271 is located ahead of the pressure-side slipper cam surface 90S in the second circumferential direction S2.

In the clutch device 210 according to this preferred embodiment, the center-side recess 241 communicates with the oil passage 271. Thus, clutch oil flowing in the oil passage 271 also flows in the center-side recess 241. The center-side recess 241 is recessed radially inward from the outer peripheral surface 258A of the center-side fitting portion 258 over the entire outer peripheral surface 258A in the directions D. Thus, a larger amount of clutch oil can be discharged to the outside of the pressure plate 270 through the center-side recess 241. That is, a larger amount of clutch oil can be supplied to the input-side rotating plates 20 and the output-side rotating plates 22. In addition, since the center-side recess 241 is continuous with center-side cam hole 243H when seen in the directions D, when clutch oil flows from the outside of the pressure plate 270 into the pressure plate 270 through the center-side cam hole 243H, the clutch oil that has flowed in the pressure plate 270 is held in the center-side recess 241. Accordingly, clutch oil can be supplied from the center-side recess 241 to the input-side rotating plates 20 and the output-side rotating plates 22.

The following paragraphs describe other specific aspects of the techniques disclosed herein.

A clutch device to allow or interrupt transfer of a rotation driving force of an input shaft to an output shaft includes a clutch center housed in a clutch housing holding a plurality of input-side rotating plates to be rotationally driven by rotational driving of the input shaft, the clutch center being operable to be rotationally driven together with the output shaft; and a pressure plate movable toward or away from the clutch center and rotatable relative to the clutch center, the pressure plate holding at least one of the input-side rotating plates or output-side rotating plates and being operable to press the input-side rotating plates and the output-side rotating plates, the input-side rotating plates and the output-side rotating plates being alternately arranged. The pressure plate includes an outer peripheral wall including pressure-side fitting teeth holding the output-side rotating plates, a pressure-side fitting portion located on an inner peripheral surface of the outer peripheral wall, and an oil passage at least a portion of which is located in the inner peripheral surface of the outer peripheral wall and which guides clutch oil to the pressure-side fitting portion. The clutch center includes a plurality of center-side cam portions each including at least one of a center-side assist cam surface or a center-side slipper cam surface, the center-side assist cam surface being operable to generate a force in a direction from the pressure plate toward the clutch center in order to increase a pressing force between the input-side rotating plates and the output-side rotating plates upon rotation relative to the pressure plate, the center-side slipper cam surface being operable to cause the pressure plate to move away from the clutch center in order to reduce the pressing force between the input-side rotating plates and the output-side rotating plates upon rotation relative to the clutch center, a center-side cam hole penetrating a portion between adjacent ones of the center-side cam portions, a center-side fitting portion located radially outward of the center-side cam portions and slidably fitting in the center-side fitting portion, and a center-side recess located on an outer peripheral surface of the center-side fitting portion, recessed radially inward from the outer peripheral surface over the entire outer peripheral surface in movement directions, and being continuous with the center-side cam hole when seen in the movement directions, assuming directions in which the pressure plate moves toward and away from the clutch center are the movement directions. The center-side recess communicates with the oil passage.

The foregoing description is directed to the preferred embodiments of the present disclosure. The preferred embodiments described above, however, are merely examples, and the present disclosure can be performed in various modes and through various preferred embodiments.

In the first preferred embodiment described above, the oil flow hole 49 is formed in the second center-side recess 41HB of the center-side recess 41H, but the present disclosure is not limited to this example. The oil flow hole 49 may be formed in the first center-side recess 41HA of the center-side recess 41H.

In the first and second preferred embodiments described above, each of the center-side cam portions 60 includes the center-side assist cam surface 60A and the center-side slipper cam surface 60S, but only needs to include at least one of the center-side assist cam surface 60A or the center-side slipper cam surface 60S.

In the first and second preferred embodiments described above, each of the pressure-side cam portions 90 includes the pressure-side assist cam surface 90A and the pressure-side slipper cam surface 90S, but only needs to include at least one of the pressure-side assist cam surface 90A or the pressure-side slipper cam surface 90S.

In the second preferred embodiment described above, the clutch center 240 is configured not to hold the output-side rotating plates 22, but the present disclosure is not limited to this example. The clutch center 240 may include center-side fitting teeth having a configuration similar to that of the pressure-side fitting teeth 77 of the first preferred embodiment capable of holding the output-side rotating plates 22.

In the second preferred embodiment described above, the center-side recess 241 is located closer to the center-side assist cam surface 60A than the center of the center-side cam portions 60 in the circumferential directions S, but may be located closer to the center-side slipper cam surface 60S. In this case, the oil passage 271 is located ahead of the pressure-side slipper cam surface 90S in the second circumferential direction S2.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A clutch device to allow or interrupt transfer of a rotation driving force of an input shaft to an output shaft, the clutch device comprising:
   a clutch center housed in a clutch housing holding a plurality of input-side rotating plates to be rotationally driven by rotational driving of the input shaft, the clutch center holding a plurality of output-side rotating plates and being operable to be rotationally driven together with the output shaft, the input-side rotating plates and the output-side rotating plates being alternately arranged; and
   a pressure plate movable toward or away from the clutch center and rotatable relative to the clutch center, the pressure plate being operable to press the input-side rotating plates and the output-side rotating plates;
   wherein
   the clutch center includes:
     an output shaft holding portion to which the output shaft is coupled;
     an outer peripheral wall located radially outward of the output shaft holding portion;
     a center-side fitting portion located on an inner peripheral surface of the outer peripheral wall; and
     an oil passage at least a portion of which is located in the inner peripheral surface of the outer peripheral wall to guide clutch oil to the center-side fitting portion;
   the pressure plate includes:
     a plurality of pressure-side cam portions each including at least one of a pressure-side assist cam surface or a pressure-side slipper cam surface, the pressure-side assist cam surface being operable to generate a force in a direction from the pressure plate toward the clutch center in order to increase a pressing force between the input-side rotating plates and the output-side rotating plates upon rotation relative to the clutch center, the pressure-side slipper cam surface being operable to cause the pressure plate to move away from the clutch center in order to reduce the pressing force between the input-side rotating plates and the output-side rotating plates upon rotation relative to the clutch center;

a pressure-side cam hole penetrating a portion between adjacent ones of the pressure-side cam portions;

a pressure-side fitting portion located radially outward of the pressure-side cam portions and slidably fitting in the center-side fitting portion; and a pressure-side recess located on an outer peripheral surface of the pressure-side fitting portion, recessed radially inward from the outer peripheral surface over the entire outer peripheral surface in movement directions, and being continuous with the pressure-side cam hole when seen in the movement directions, assuming directions in which the pressure plate moves toward and away from the clutch center are the movement directions; and the pressure-side recess communicates with the oil passage.

2. The clutch device according to claim 1, wherein each of the pressure-side cam portions includes the pressure-side assist cam surface and the pressure-side slipper cam surface;

the pressure-side assist cam surface and the pressure-side slipper cam surface are arranged in circumferential directions; and the pressure-side recess includes a first pressure-side recess located closer to the pressure-side assist cam surface than a center of the pressure-side cam portion in the circumferential directions.

3. The clutch device according to claim 2, wherein the pressure-side recess includes a second pressure-side recess located closer to the pressure-side slipper cam surface than the center of the pressure-side cam portion in the circumferential directions.

4. The clutch device according to claim 3, wherein a length of the second pressure-side recess in the circumferential directions is longer than a length of the first pressure-side recess in the circumferential directions.

5. The clutch device according to claim 3, wherein the clutch center includes a plurality of center-side cam portions each including a center-side slipper cam surface operable to cause the pressure plate to move away from the clutch center in order to reduce the pressing force between the input-side rotating plates and the output-side rotating plates upon rotation relative to the pressure plate;

the oil passage includes a center-side recess recessed radially outward from the inner peripheral surface of the outer peripheral wall;

the center-side recess includes a second center-side recess located at a side of the center-side slipper cam surface in the circumferential directions; and a length of the second pressure-side recess in the circumferential directions is longer than a length of the second center-side recess in the circumferential directions.

6. The clutch device according to claim 2, wherein the clutch center includes a plurality of center-side cam portions each including a center-side assist cam surface operable to generate a force in a direction from the pressure plate toward the clutch center in order to increase the pressing force between the input-side rotating plates and the output-side rotating plates upon rotation relative to the pressure plate;

the oil passage includes a center-side recess recessed radially outward from the inner peripheral surface of the outer peripheral wall;

the center-side recess includes a first center-side recess located at a side of the center-side assist cam surface in the circumferential directions; and a length of the first center-side recess in the circumferential directions is longer than a length of the first pressure-side recess in the circumferential directions.

7. The clutch device according to claim 1, wherein the oil passage includes a center-side recess recessed radially outward from the inner peripheral surface of the outer peripheral wall; and a depth of the pressure-side recess in radial directions is deeper than a depth of the center-side recess in the radial directions.

8. The clutch device according to claim 1, wherein the pressure plate includes:
  a flange extending radially outward from an outer edge of the pressure-side fitting portion; and
  a plurality of pressure-side fitting teeth located on the flange, holding the input-side rotating plates and the output-side rotating plates, and arranged in the circumferential directions, the flange includes:
  a pressing surface operable to apply a pressing force to the input-side rotating plates and the output-side rotating plates; and
  a connection surface including the pressure-side fitting teeth, located radially inward of the pressing surface, and connected to the pressure-side fitting portion; and the pressing surface and the connection surface are parallel or substantially parallel to each other.

9. The clutch device according to claim 1, wherein the pressure plate includes:
  a flange extending radially outward from an outer edge of the pressure-side fitting portion; and
  a plurality of pressure-side fitting teeth located on the flange, holding the input-side rotating plates and the output-side rotating plates, and arranged in the circumferential directions;

the flange includes a first portion in which a distance between adjacent ones of the pressure-side fitting teeth in the circumferential directions is a first length and a second portion having a second length longer than the first length; and assuming a circumferential direction from a first pressure-side cam portion to a second pressure-side cam portion is a first circumferential direction and a circumferential direction from the second pressure-side cam portion to the first pressure-side cam portion is a second circumferential direction, the pressure plate is rotatable in the first circumferential direction; and the second portion is located ahead, in the second circumferential direction, of an end of the pressure-side recess in the first circumferential direction.

10. The clutch device according to claim 1, wherein the pressure plate includes:
- a flange extending radially outward from an outer edge of the pressure-side fitting portion; and
- a plurality of pressure-side fitting teeth located on the flange, holding the input-side rotating plates and the output-side rotating plates, and arranged in the circumferential directions;

the clutch center includes:
- a plurality of center-side fitting teeth holding the input-side rotating plates and the output-side rotating plates, projecting radially outward from an outer peripheral surface of the outer peripheral wall, and arranged in circumferential directions;
- a plurality of spline grooves each located between adjacent ones of the center-side fitting teeth; and
- an oil flow hole located in one of the spline grooves to penetrate the outer peripheral wall to allow clutch oil flowing at an inner peripheral side of the outer peripheral wall to be discharged to outside of the clutch center;

the pressure-side fitting teeth include at least one oil return fitting tooth located radially outward of the pressure-side recess; and the pressure-side recess overlaps with at least a portion of the oil flow hole when seen in radial directions.

11. The clutch device according to claim 10, wherein when seen in the radial directions, at least a portion of the spline groove including the oil flow hole overlaps with the oil return fitting tooth.

12. A motorcycle comprising the clutch device according to claim 1.

13. A clutch device to allow or interrupt transfer of a rotation driving force of an input shaft to an output shaft, the clutch device comprising:
- a clutch center housed in a clutch housing holding a plurality of input-side rotating plates to be rotationally driven by rotational driving of the input shaft, the clutch center holding a plurality of output-side rotating plates and being operable to be rotationally driven together with the output shaft, the input-side rotating plates and the output-side rotating plates being alternately arranged; and
- a pressure plate movable toward or away from the clutch center and rotatable relative to the clutch center, the pressure plate being operable to press the input-side rotating plates and the output-side rotating plates; wherein the clutch center includes:
- an output shaft holding portion to which the output shaft is coupled;
- an outer peripheral wall located radially outward of the output shaft holding portion;
- a center-side fitting portion located on an inner peripheral surface of the outer peripheral wall; and
- an oil passage at least a portion of which is located in the inner peripheral surface of the outer peripheral wall to guide clutch oil to the center-side fitting portion;

the pressure plate includes:
- a plurality of pressure-side cam portions each including at least a pressure-side slipper cam surface from among a pressure-side assist cam surface and the pressure-side slipper cam surface, the pressure-side assist cam surface being operable to generate a force in a direction from the pressure plate toward the clutch center in order to increase a pressing force between the input-side rotating plates and the output-side rotating plates upon rotation relative to the clutch center, the pressure-side slipper cam surface being operable to cause the pressure plate to move away from the clutch center in order to reduce the pressing force between the input-side rotating plates and the output-side rotating plates upon rotation relative to the clutch center;
- a pressure-side cam hole penetrating a portion between adjacent ones of the pressure-side cam portions;
- a pressure-side fitting portion located radially outward of the pressure-side cam portions and slidably fitting in the center-side fitting portion; and
- a pressure-side recess located radially inward of an outer peripheral surface of the pressure-side fitting portion over the entire outer peripheral surface in movement directions and radially outward of the pressure-side cam portion and overlapping and continuous with the pressure-side fitting portion in a circumferential direction from a portion of the pressure-side recess located radially outward of the pressure-side slipper cam surface, assuming directions in which the pressure plate moves toward and away from the clutch center are the movement directions; and the pressure-side recess communicates with the oil passage.

* * * * *